(12) United States Patent
    Tokutake

(10) Patent No.: US 9,430,112 B2
(45) Date of Patent: Aug. 30, 2016

(54) INFORMATION PROCESSING APPARATUS

(71) Applicants: SONY MOBILE COMMUNICATIONS, INC., Tokyo (JP); SONY CORPORATION, Tokyo (JP)

(72) Inventor: Kenji Tokutake, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/477,530

(22) Filed: Sep. 4, 2014

(65) Prior Publication Data

US 2014/0368469 A1     Dec. 18, 2014

Related U.S. Application Data

(63) Continuation of application No. 13/562,815, filed on Jul. 31, 2012, now Pat. No. 8,872,794.

(60) Provisional application No. 61/552,550, filed on Oct. 28, 2011.

(51) Int. Cl.
    *G06F 3/044* (2006.01)

(52) U.S. Cl.
    CPC ..... *G06F 3/044* (2013.01); *G06F 2203/04101* (2013.01)

(58) Field of Classification Search
    CPC ........ G06F 3/041; G06F 3/044; G06F 3/048; G06F 3/0487; G06F 2203/04108; H03K 17/955; H03K 17/962

USPC ......... 345/173–178; 178/18.01–18.09, 18.11
See application file for complete search history.

(56) References Cited

U.S. PATENT DOCUMENTS

| | | |
|---|---|---|
| 2003/0052867 A1 | 3/2003 | Shigetaka et al. |
| 2008/0059898 A1* | 3/2008 | Deggelmann .......... G06F 3/048 715/764 |
| 2008/0122798 A1 | 5/2008 | Koshiyama et al. |
| 2009/0289914 A1 | 11/2009 | Cho |
| 2009/0322497 A1 | 12/2009 | Ku et al. |
| 2010/0238116 A1 | 9/2010 | Shin |
| 2011/0032193 A1 | 2/2011 | Szalkowski |
| 2011/0096024 A1 | 4/2011 | Kwak |
| 2013/0097550 A1 | 4/2013 | Grossman et al. |
| 2014/0011547 A1 | 1/2014 | Jingushi et al. |

FOREIGN PATENT DOCUMENTS

| | | |
|---|---|---|
| JP | 2011-070525 | 4/2011 |
| JP | 2011-172078 | 9/2011 |

* cited by examiner

*Primary Examiner* — Stephen Sherman
(74) *Attorney, Agent, or Firm* — Oblon, McClelland, Maier & Neustadt, L.L.P.

(57) ABSTRACT

An information processing apparatus including a touch panel that detects a non-contact operation of an operation element by detecting an electrostatic capacitance of an operation surface of the touch panel; and a controller that determines a distance between the operation surface and the operation element based on the detected electrostatic capacitance, and controls a predetermined operation of the information processing apparatus based on the determined distance.

20 Claims, 17 Drawing Sheets

FIG. 6

| Y\X | 1 | 2 | 3 | 4 | 5 | 6 | 7 | 8 | 9 | 10 |
|---|---|---|---|---|---|---|---|---|---|---|
| 1 | 10 | 8 | 8 | 10 | 7 | 8 | 7 | 9 | 10 | 8 |
| 2 | 8 | 7 | 9 | 7 | 8 | 7 | 8 | 7 | 8 | 8 |
| 3 | 8 | 8 | 10 | 7 | 8 | 7 | 9 | 10 | 8 | 9 |
| 4 | 7 | 8 | 7 | 8 | 7 | 8 | 8 | 10 | 7 | 9 |
| 5 | 7 | 8 | 7 | 10 | 7 | 8 | 7 | 9 | 10 | 8 |
| 6 | 10 | 7 | 8 | 8 | 10 | 7 | 8 | 7 | 9 | 10 |
| 7 | 7 | 9 | 10 | 10 | 7 | 8 | 8 | 8 | 10 | 7 |
| 8 | 7 | 9 | 8 | 10 | 7 | 8 | 7 | 9 | 10 | 8 |
| 9 | 8 | 8 | 8 | 7 | 9 | 10 | 8 | 8 | 10 | 7 |
| 10 | 9 | 10 | 10 | 8 | 8 | 7 | 9 | 10 | 8 | 10 |
| 11 | 8 | 7 | 9 | 9 | 10 | 10 | 8 | 8 | 10 | 7 |
| 12 | 8 | 10 | 7 | 9 | 9 | 8 | 10 | 7 | 9 | 10 |
| 13 | 8 | 7 | 90 | 10 | 8 | 8 | 7 | 9 | 10 | 8 |
| 14 | 7 | 90 | 100 | 90 | 8 | 8 | 10 | 7 | 9 | 9 |
| 15 | 8 | 8 | 90 | 8 | 7 | 8 | 7 | 9 | 10 | 8 |
| 16 | 9 | 10 | 9 | 10 | 8 | 7 | 9 | 10 | 8 | 10 |
| 17 | 8 | 7 | 9 | 10 | 8 | 8 | 7 | 9 | 10 | 8 |
| 18 | 8 | 10 | 7 | 9 | 9 | 7 | 8 | 7 | 9 | 10 |
| 19 | 8 | 7 | 9 | 10 | 8 | 7 | 10 | 8 | 8 | 10 |
| 20 | 8 | 8 | 10 | 7 | 8 | 7 | 9 | 10 | 8 | 9 |

FIG. 7

| Y\X | 1  | 2  | 3  | 4  | 5  | 6  | 7  | 8  | 9  | 10 |
|-----|----|----|----|----|----|----|----|----|----|----|
| 1   | 10 | 8  | 8  | 10 | 7  | 8  | 7  | 9  | 10 | 8  |
| 2   | 8  | 7  | 9  | 7  | 8  | 7  | 8  | 7  | 8  | 8  |
| 3   | 8  | 8  | 10 | 7  | 8  | 7  | 9  | 10 | 8  | 9  |
| 4   | 7  | 8  | 7  | 8  | 7  | 8  | 8  | 10 | 7  | 9  |
| 5   | 7  | 8  | 7  | 10 | 7  | 8  | 7  | 9  | 10 | 8  |
| 6   | 10 | 7  | 8  | 8  | 10 | 7  | 8  | 7  | 9  | 10 |
| 7   | 7  | 9  | 10 | 10 | 7  | 8  | 8  | 8  | 10 | 7  |
| 8   | 7  | 9  | 8  | 10 | 7  | 8  | 7  | 9  | 10 | 8  |
| 9   | 8  | 8  | 8  | 7  | 9  | 10 | 8  | 8  | 10 | 7  |
| 10  | 9  | 10 | 10 | 8  | 8  | 7  | 9  | 10 | 8  | 10 |
| 11  | 8  | 7  | 9  | 9  | 10 | 10 | 8  | 8  | 10 | 7  |
| 12  | 8  | 10 | 30 | 9  | 9  | 8  | 10 | 7  | 9  | 10 |
| 13  | 8  | 7  | 40 | 30 | 8  | 8  | 7  | 9  | 10 | 8  |
| 14  | 7  | 30 | 50 | 40 | 30 | 8  | 10 | 7  | 9  | 9  |
| 15  | 8  | 20 | 30 | 40 | 30 | 8  | 7  | 9  | 10 | 8  |
| 16  | 9  | 10 | 20 | 20 | 8  | 7  | 9  | 10 | 8  | 10 |
| 17  | 8  | 7  | 9  | 10 | 8  | 8  | 7  | 9  | 10 | 8  |
| 18  | 8  | 10 | 7  | 9  | 9  | 7  | 8  | 7  | 9  | 10 |
| 19  | 8  | 7  | 9  | 10 | 8  | 7  | 10 | 8  | 8  | 10 |
| 20  | 8  | 8  | 10 | 7  | 8  | 7  | 9  | 10 | 8  | 9  |

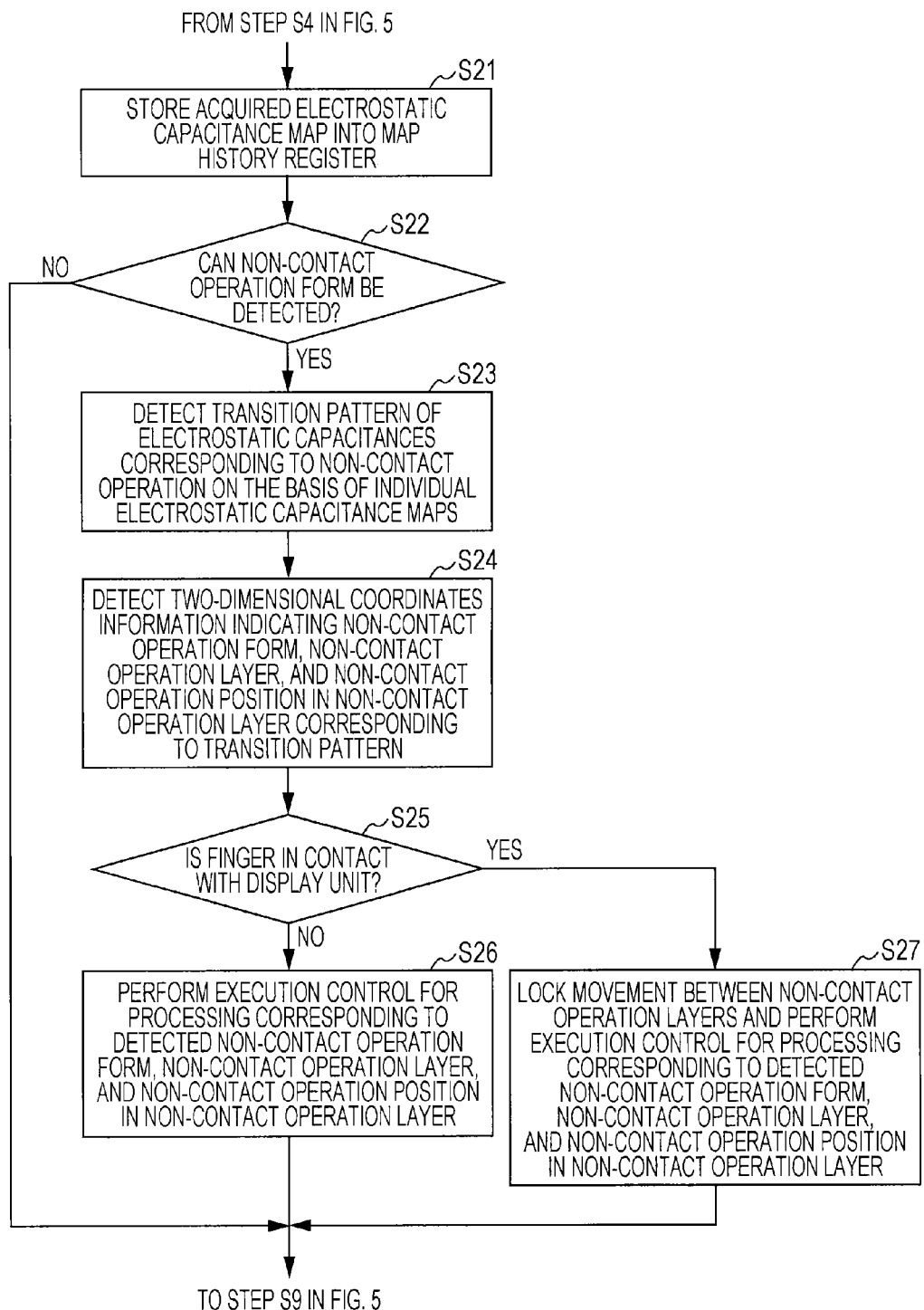

FRAME DISPLAY CHANGED WHEN FIRST OPERATION LAYER IS SELECTED

FRAME DISPLAY CHANGED WHEN SECOND OPERATION LAYER IS SELECTED

FRAME DISPLAY CHANGED CHANGED WHEN THIRD OPERATION LAYER IS SELECTED

FILE SELECTED FROM SECOND OPERATION LAYER

FIG. 17

| TYPE OF NON-CONTACT OPERATION | OPERATION DETAILS | OPERATION ATTRIBUTE | PROCESSING DETAILS WHEN ASSIST-TOUCH OPERATION IS NOT PERFORMED | PROCESSING DETAILS WHEN ASSIST-TOUCH OPERATION IS PERFORMED |
|---|---|---|---|---|
| LAYER-UP OPERATION | STOP FINGER IN UPPER LAYER DURING CERTAIN PERIOD OF TIME | THREE-DIMENSIONAL TOUCH EVENT | MOVE EFFECTIVE LAYER UPWARD IN ACCORDANCE WITH LAYER-UP OPERATION AND CHANGE DISPLAY FORM OF FRAME CORRESPONDING TO EFFECTIVE LAYER AND DISPLAY FORM OF ICON EXISTING IN EFFECTIVE LAYER | CANCEL LAYER-UP OPERATION AND FIX LAYER TO BE OPERATED TO CURRENT LAYER |
| LAYER-DOWN OPERATION | STOP FINGER IN LOWER LAYER DURING CERTAIN PERIOD OF TIME | THREE-DIMENSIONAL TOUCH EVENT | MOVE EFFECTIVE LAYER DOWNWARD IN ACCORDANCE WITH LAYER-DOWN OPERATION AND CHANGE DISPLAY FORM OF FRAME CORRESPONDING TO EFFECTIVE LAYER AND DISPLAY FORM OF ICON EXISTING IN EFFECTIVE LAYER | CANCEL LAYER-DOWN OPERATION AND FIX LAYER TO BE OPERATED TO CURRENT LAYER |
| DRAG OPERATION | MOVE FINGER IN TWO-DIMENSIONAL DIRECTION OR THREE-DIMENSIONAL DIRECTION WITH OPERATION TARGET SELECTED | THREE-DIMENSIONAL TOUCH EVENT | MOVE DISPLAY POSITION OF SELECTED ICON IN TWO-DIMENSIONAL DIRECTION OR THREE-DIMENSIONAL DIRECTION IN ACCORDANCE WITH DRAG OPERATION | ACCEPT ONLY DRAG OPERATION IN TWO-DIMENSIONAL DIRECTION AND CANCEL DRAG OPERATION IN THREE-DIMENSIONAL DIRECTION |
| INTER-LAYER UP OPERATION | MOVE FINGER IN DIRECTION TOWARD DISPLAY UNIT IN LAYER AND INCREASE ELECTROSTATIC CAPACITANCE BY CERTAIN AMOUNT | TWO-DIMENSIONAL TOUCH EVENT | TREAT OPERATION AS EXECUTION OF TAP INPUT FOR ICON SELECTED BY INTER-LAYER UP OPERATION | TREAT OPERATION AS EXECUTION OF TAP INPUT FOR ICON SELECTED BY INTER-LAYER UP OPERATION |
| MOVE-UP OPERATION | MOVE FINGER TO SECOND LAYER UP FROM CURRENT LAYER | THREE-DIMENSIONAL TOUCH EVENT | BECOME EFFECTIVE WHEN ICON IS SELECTED AND MOVE SELECTED ICON TO UPPER LAYER CORRESPONDING TO MOVE-UP OPERATION | CANCEL MOVE-UP OPERATION |
| INTER-LAYER DOWN OPERATION | MOVE FINGER IN DIRECTION AWAY FROM DISPLAY UNIT IN LAYER AND DECREASE ELECTROSTATIC CAPACITANCE BY CERTAIN AMOUNT | TWO-DIMENSIONAL TOUCH EVENT | TREAT OPERATION AS SELECTION OF ICON FOR WHICH INTER-LAYER DOWN OPERATION HAS BEEN PERFORMED | TREAT OPERATION AS SELECTION OF ICON FOR WHICH INTER-LAYER DOWN OPERATION HAS BEEN PERFORMED |
| MOVE-DOWN OPERATION | MOVE FINGER TO SECOND LAYER DOWN FROM CURRENT LAYER | THREE-DIMENSIONAL TOUCH EVENT | BECOME EFFECTIVE WHEN ICON IS SELECTED AND MOVE SELECTED ICON TO LOWER LAYER CORRESPONDING TO MOVE-DOWN OPERATION | CANCEL MOVE-DOWN OPERATION |

INFORMATION PROCESSING APPARATUS

CROSS REFERENCE TO RELATED APPLICATION

This is a continuation of U.S. application Ser. No. 13/562,815, filed Jul. 31, 2012, the entire contents of which is incorporated herein by reference. U.S. Ser. No. 13/562,815, claims the benefit of priority under 119(e) of U.S. Provisional Patent Application Ser. No. 61/552,550 filed on Oct. 28, 2011.

BACKGROUND

1. Field of the Disclosure

The present disclosure relates to an information processing apparatus suitably applied to, for example, an electronic apparatus including an operated part, such as a touch panel, that detects an operation form on the basis of a change in the electrostatic capacitance of an operation surface part.

Specifically, the present disclosure relates to an information processing apparatus suitably applied to an electronic apparatus such as, for example, a cellular phone device, a PHS telephone set (PHS: Personal Handyphone System), a PDA device (PDA: Personal Digital Assistant), a digital camera device, a digital video camera device, a portable game machine, and a notebook-sized personal computer device.

2. Description of Related Art

At present, cellular phone devices including an electrostatic-capacitance touch panel are known, as disclosed, for example, in Japanese Unexamined Patent Application Publication No. 2011-172078, Japanese Unexamined Patent Application Publication No. 2011-070525, and the like.

In a cellular phone device including such a touch panel, a controller detects a contact operation via the touch panel on the basis of an input processing program. Then, the controller performs execution control for a process corresponding to the detected contact operation among individual information processes of a certain application program.

SUMMARY

However, in the case of a cellular phone device including a touch panel, an input operation is uniformly carried out when a two-dimensional contact operation is performed on the touch panel.

That is, in the case of a known cellular phone device including a touch panel, a uniform input operation form, "execution of a two-dimensional contact operation on the touch panel," is employed. Thus, a problem occurs in that there is no variety in input operation forms.

The inventor is aware of the desire of information processing apparatuses, as electronic apparatuses including a touch panel, capable of accepting an input operation in a new operation form, in addition to a two-dimensional contact operation.

According to an embodiment of the present disclosure, there is provided an information processing apparatus including a touch panel that detects a non-contact operation of an operation element by detecting an electrostatic capacitance of an operation surface of the touch panel; and a controller that determines a distance between the operation surface and the operation element based on the detected electrostatic capacitance, and controls a predetermined operation of the information processing apparatus based on the determined distance.

According to an embodiment of the present disclosure, a new input operation in which three-dimensional input is carried out by performing a non-contact operation for each of non-contact operation layers above an operation surface part can be provided.

BRIEF DESCRIPTION OF DRAWINGS

FIG. 6 is a diagram illustrating an example of an electrostatic capacitance map detected at the time of a contact operation for the cellular phone device according to the embodiment.

FIG. 7 is a diagram illustrating an example of an electrostatic capacitance map detected at the time of a non-contact operation for the cellular phone device according to the embodiment.

FIG. 9 is a flowchart for explaining an input processing operation at the time of a non-contact operation for the cellular phone device according to the embodiment.

FIG. 17 is a diagram for explaining assist operations for a non-contact operation for the cellular phone device according to the embodiment.

DETAILED DESCRIPTION

The present disclosure is applicable to, for example, a cellular phone device.

Configuration of Cellular Phone Device

Figure 1:
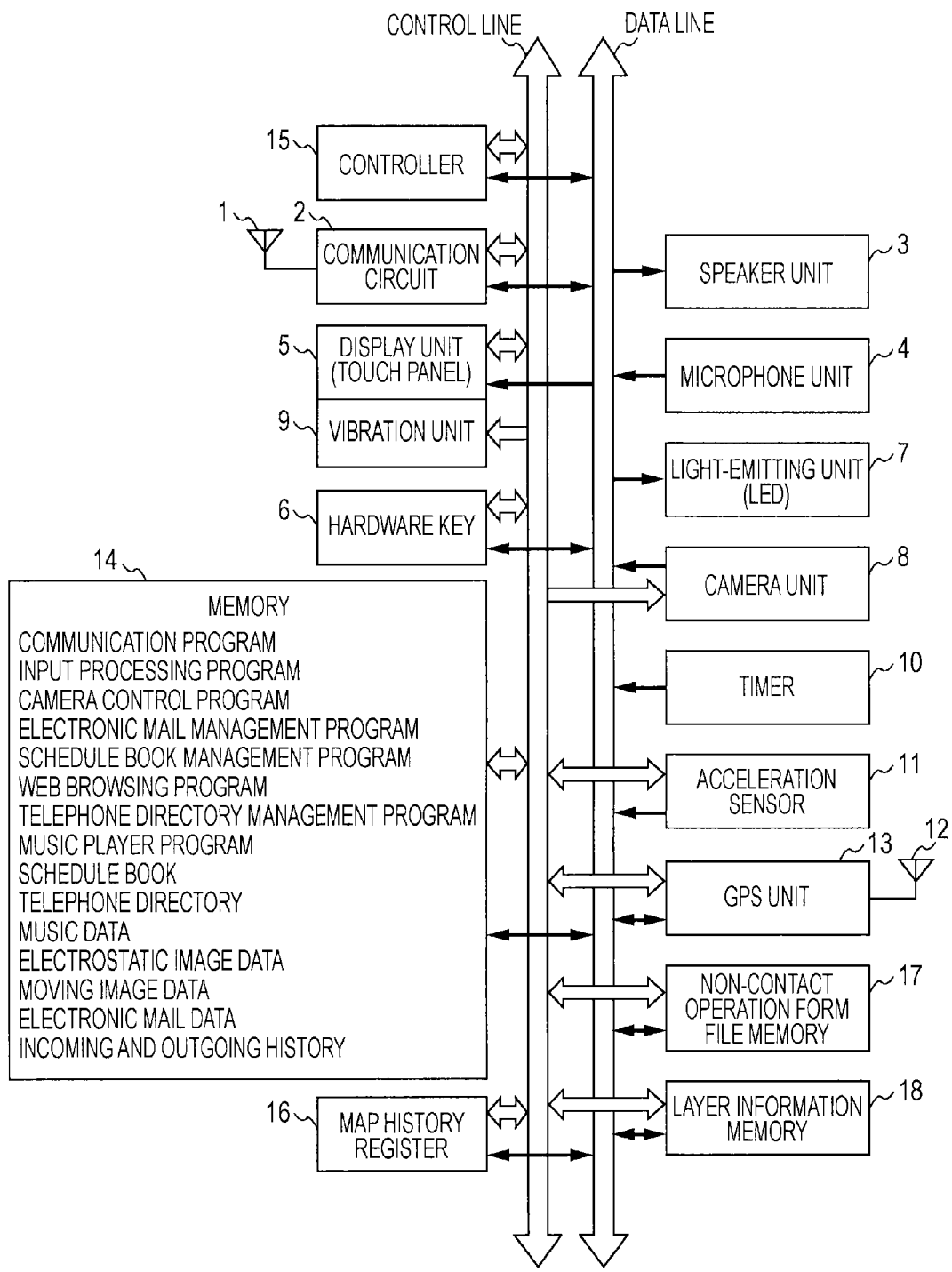
FIG. 1 is a block diagram of a cellular phone device according to an embodiment to which the present disclosure is applied.

FIG. 1 is a block diagram of a cellular phone device according to an embodiment of the present disclosure. As illustrated in FIG. 1, the cellular phone device according to this embodiment includes an antenna 1 and a communication circuit 2 that perform wireless communication of voice calls, television telephone calls, electronic mails, Web data (Web: World Wide Web), and the like with a base station.

Furthermore, the cellular phone device includes a speaker unit 3 for acquiring acoustic output of received voice and the like, a microphone unit 4 for collecting voice to be transmitted and the like, a display unit 5 serving as a so-called touch panel for which a contact operation or a non-contact operation, which will be described later, is performed, and a plurality of hardware keys 6 physically provided on a casing of the cellular phone device.

Furthermore, the cellular phone device includes a light-emitting unit 7 (LED: Light Emitting Diode) for informing, using light, a user of incoming and outgoing communications, a camera unit 8 for capturing an electrostatic image or a moving image of a desired object, vibration units 9 for informing a user of incoming and outgoing communications by vibrating the casing of the cellular phone device, and a timer 10 for counting the current time.

Figure 2:
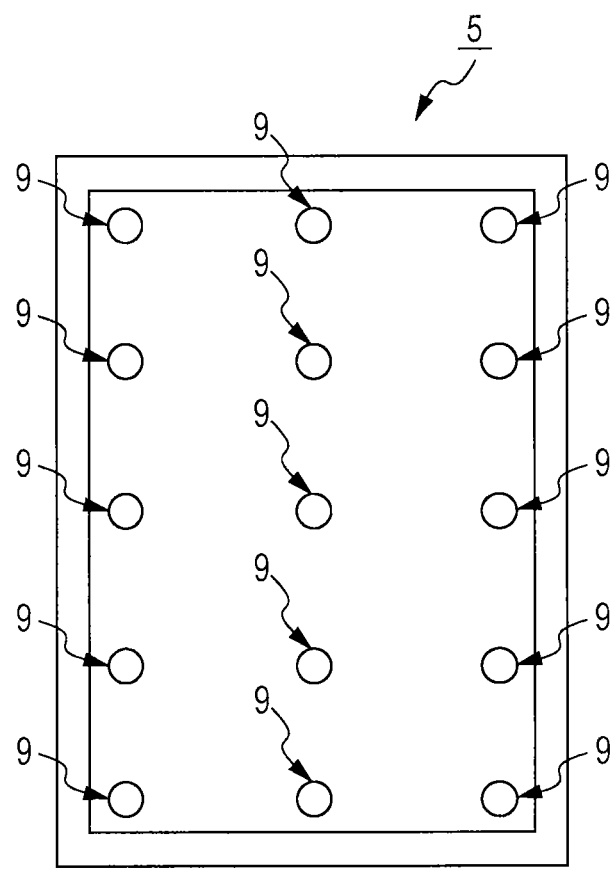
FIG. 2 is a diagram illustrating an example of locations of vibration units provided in plural form in the cellular phone device according to the embodiment.

In the case of the cellular phone device of this embodiment, the vibration units 9 are provided in plural form on the rear side of the display unit 5 in the casing so as to cover individual contact positions in the display unit 5, for example, as illustrated in FIG. 2. Among the individual vibration units 9, vibration units 9 that correspond to a contact operation position and a three-dimensional non-contact operation position, which will be described later, are subjected to drive control. Accordingly, an operator is informed of the current contact operation position or three-dimensional non-contact operation position.

Furthermore, the cellular phone device includes an acceleration sensor 11 for detecting a vibration operation and the like added to the casing of the cellular phone device, and a GPS antenna 12 (GPS: Global Positioning System) and a GPS unit 13 for detecting the current position of the cellular phone device and the captured position of an electrostatic image or a moving image captured by the camera unit 8.

Furthermore, the cellular phone device includes a memory 14 that stores, in addition to a communication program for performing wireless communication processing via the base station and various application programs, various types of data and the like handled by the various application programs, and a controller 15 for controlling the operation of the entire cellular phone device.

Furthermore, the cellular phone device includes a map history register 16 that stores an electrostatic capacitance map indicating the electrostatic capacitances of all the sensors of the display unit 5 serving as a touch panel.

The map history register 16 includes a storage area for contact operations and a storage area for non-contact operations. The electrostatic capacitances of all the sensors of the display unit 5 are detected with certain time intervals at times of contact operations and non-contact operations. Then, electrostatic capacitance maps detected with the certain time intervals at times of contact operations are sequentially stored in the storage area for contact operations in the map history register 16. In addition, electrostatic capacitance maps detected with the certain time intervals at times of non-contact operations are sequentially stored in the storage area for non-contact operations in the map history register 16.

Furthermore, the cellular phone device includes a non-contact operation form file memory 17 that stores a non-contact operation form file for detecting a non-contact operation form in a three-dimensional non-contact operation.

In the case of the cellular phone device of this embodiment, an application program that can accept non-contact operations includes a non-contact operation form file in which non-contact operation form data representing the transition patterns of the electrostatic capacitance maps, which correspond to individual non-contact operation forms to be detected, is filed.

That is, in the case of the cellular phone device of this embodiment, an application program that can accept non-contact operations includes a non-contact operation form file in which the transition patterns of the electrostatic capacitance maps for individual non-contact operations of the application program are filed as the non-contact operation form data.

The controller 15 reads, at a certain timing, such as at the time of activation of an application program, a non-contact operation form file added to the application program, and loads the read non-contact operation form file into the non-contact operation form file memory 17.

The controller compares the transition pattern of electrostatic capacitance maps detected at the time of a non-contact operation with the transition pattern of the electrostatic capacitance maps represented by each piece of the non-contact operation form data in the non-contact operation form file of the application program, which is loaded into the non-contact operation form file memory 17, and detects the non-contact operation form. Then, the controller 15 performs execution control for an operation corresponding to the detected non-contact operation form, on the basis of the running application program.

Furthermore, the cellular phone device includes a layer information memory 18 that writes and reads, by functioning as an application execution controller, information on the basis of the currently running application program. Information indicating layers in which individual files, data, and the like are located, the status (active/inactive) of the individual files and data, and the like are written to or read from the layer information memory 18.

An input processing program for performing information processing (input processing) for contact operations and three-dimensional non-contact operations for the display unit 5 serving as a touch panel, as well as the communication program mentioned above, is stored in the memory 14.

Furthermore, a camera control program for performing capturing control for electrostatic images or moving images for the camera unit 8 is stored in the memory 14. The camera control program includes a viewer program for displaying captured electrostatic images on the display unit 5 or the like. The viewer program has a function of changing the display magnification by performing enlarging processing or reducing processing on display images, a face recognition function of detecting face images of objects (human beings) in the electrostatic images, and the like.

Furthermore, the camera control program includes a moving image playback program for displaying captured moving images on the display unit 5 or the like. Furthermore, the moving image playback program has a playback speed changing function of performing change control for the playback speed of moving images.

Furthermore, an electronic mail management program for controlling creation and transmission/reception of electronic mails and a schedule book management program for performing management of a schedule book in which schedules of a user are registered are stored in the memory 14.

Furthermore, a Web browsing program for performing browsing of Web pages and the like by accessing a server device provided on a certain network such as a communication network or the Internet to transmit and receive information, a telephone directory management program for performing management of a telephone directory for registering personal information, such as the names, addresses, telephone numbers, email addresses, and photographs of faces, of friends and acquaintances (=a registration area for the personal information), and a music player program for playing back music data are stored in the memory 14.

Furthermore, a schedule book in which desired schedules of a user are registered (=a registration area for schedule data) and a telephone directory in which the user names, electrostatic images (photographs of faces etc.), addresses, telephone numbers, email addresses, birth dates, and the like of acquaintances and friends of the user are registered (=a registration area for personal information of individual users) are stored in the memory 14.

Furthermore, music data to be played back on the basis of the music player program, electrostatic image data and moving image data to be played back on the basis of the viewer program and the moving image playback program of the camera control program, transmitted and received electronic mail data, histories of incoming and outgoing telephone calls and electronic mails, and the like are stored in the memory 14.

A "projection-type electrostatic-capacitance touch panel" is provided as a touch panel, which is the display unit 5.

The projection-type electrostatic-capacitance touch panel includes a substrate layer including an insulator film, an electrode layer arranged below the insulator film, and a control IC (control integrated circuit). In the electrode layer arranged below the insulator film, many mosaic electrode patterns each including two layers of transparent electrodes made of ITO (Indium Tin Oxide) or the like in each of vertical and horizontal directions are arranged on the substrate made of glass, plastic, or the like.

The projection-type electrostatic-capacitance touch panel detects changes in the electrostatic capacitance of electrodes caused by a contact operation or a non-contact operation from the two electrode sequences in each of vertical and horizontal directions to identify the operation position. By providing many electrode sequences in each of the vertical direction and the horizontal direction, multi-point detection of contact operations can be achieved.

In this example, the "projection-type electrostatic-capacitance touch panel" is provided as the display unit 5. However, instead of the "projection type electrostatic-capacitance touch panel", a so-called "surface-type electrostatic-capacitance touch panel" may be provided.

Input Processing Operation

By operating on the basis of the input processing program stored in the memory 14, the controller 15 of the cellular phone device detects a "contact operation," which is an operation carried out by making a control (conductive member) such as a finger be in contact with an operation surface part of the display unit 5 serving as a projection-type electrostatic-capacitance touch panel.

Furthermore, the cellular phone device detects a "non-contact operation," which is an operation carried out by performing an input operation without making a conductive member such as a finger be in contact with the operation surface part of the display unit 5 when the distance between the operation surface part of the display unit 5 and the finger is within a range where the electrostatic capacitance of the display unit 5 is changed by a certain amount or more.

Figure 3:
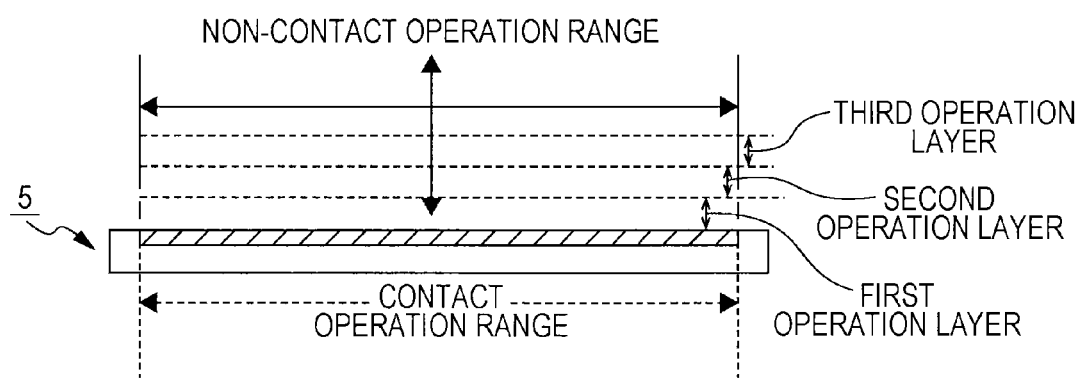
FIG. 3 is a diagram illustrating a contact operation range and a non-contact operation range for the cellular phone device according to the embodiment.

For example, in the case of the cellular phone device of this embodiment, the space above the display unit 5 is divided into three operation layers, a first operation layer, a second operation layer, and a third operation layer, in order from the operation layer closest to an operation surface part 5a of the display unit to the operation layer farthest away from the operation surface part 5a of the display unit, as illustrated in FIG. 3.

The controller 15 detects a three-dimensional non-contact operation, which covers the individual operation layers, and performs execution control for an information process based on the currently running application program, in accordance with the detected non-contact operation (and a contact operation on the display unit 5).

Figure 4:
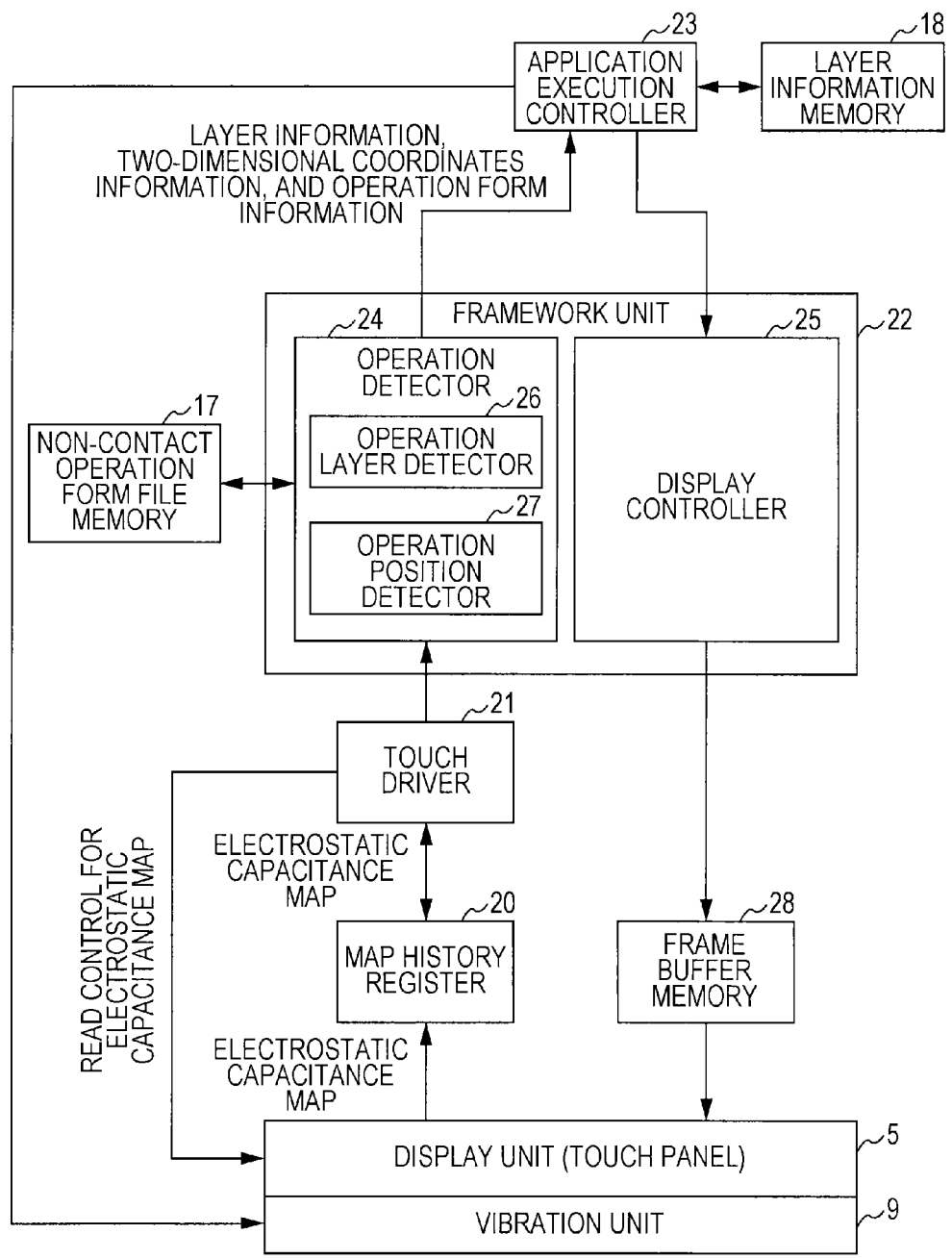
FIG. 4 is a functional block diagram of a case where a controller of the cellular phone device according to the embodiment operates on the basis of an input processing program.

FIG. 4 illustrates a functional block diagram of the controller 15, which is implemented when the controller 15 operates on the basis of the input processing program.

As illustrated in FIG. 4, when operating on the basis of the input processing program, the controller 15 functions as a touch driver 21 that performs writing control and reading control for a map history register 20 for an electrostatic capacitance map indicating the electrostatic capacitances of all the sensors of the display unit 5 serving as a touch panel.

Furthermore, when operating on the basis of the input processing program, the controller 15 functions as an operation detector 24 of a framework unit 22 that detects the operation positions, operation layers, and operation forms in a two-dimensional contact operation and a three-dimensional non-contact operation, on the basis of electrostatic capacitance maps read from the map history register 20.

Furthermore, when operating on the basis of the input processing program, the controller 15 functions as an application execution controller 23 that performs execution control for processing of an application program, on the basis of the operation positions, operation layers, operation forms, and the like in a two-dimensional contact operation and a three-dimensional non-contact operation.

Furthermore, when operating on the basis of the input processing program, the controller 15 functions as a display controller 25 that performs display control for electrostatic images, moving images, and the like corresponding to processing of the application program on the display unit 5.

Figure 5:
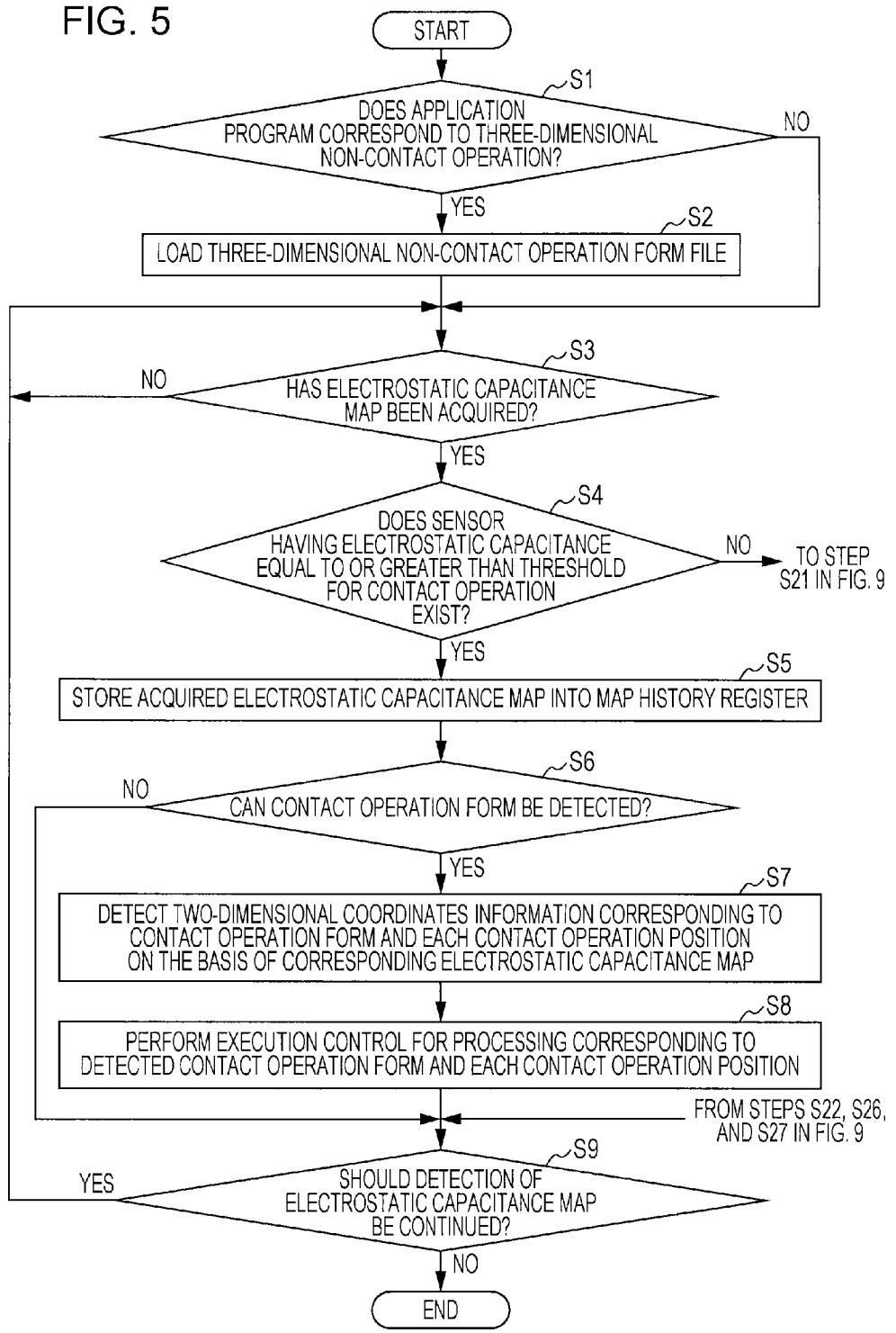
FIG. 5 is a flowchart for explaining an input processing operation of the cellular phone device according to the embodiment.

FIG. 5 illustrates a flowchart of an input processing operation of the controller 15 based on the input processing program. When the application program is activated, the controller 15 starts a process illustrated in the flowchart of FIG. 5 on the basis of the input processing program stored in the memory 14.

In the case of the cellular phone device of this embodiment, an application program capable of supporting a three-dimensional non-contact operation stores a file in which information indicating non-contact operation forms (gestures) corresponding to individual information processes is filed. Thus, when activating the application program, the controller 15 determines, by functioning as the operation detector 24 of framework unit 22 and determining whether or not the running application program includes the non-contact operation form file, whether or not the running application program is an application program that is capable of supporting a three-dimensional non-contact operation, in step S1.

Then, if the controller 15 determines that the running application program is an application program that is capable of supporting a three-dimensional non-contact operation, the controller 15 causes the process to proceed to step S2. Meanwhile, if the controller 15 determines that the running application program is an application program that does not support a three-dimensional non-contact operation, the controller 15 causes the process to proceed to step S3.

If the controller 15 determines that the running application program is an application program that is capable of supporting a three-dimensional non-contact operation and causes the process to proceed to step S2, the controller 15 continuously functions as the operation detector 24, reads the non-contact operation form file added to the running application program, and loads the read non-contact operation form file into the non-contact operation form file memory 17 illustrated in FIGS. 1 and 4.

Accordingly, non-contact operation form data indicating the transition pattern of electrostatic capacitance maps for each non-contact operation form used in the currently running application program is stored as the non-contact operation form file in the non-contact operation form file memory 17.

Next, when a contact operation or a three-dimensional non-contact operation by an operating element (control) having a conductivity, such as a finger of an operator, is performed, the electrostatic capacitance of each sensor of the display unit 5 serving as a touch panel is changed. The controller 15 identifies the operation position and the operation form on the basis of the electrostatic capacitances of the individual sensors.

Thus, when the controller 15 causes the process to proceed to step S3, the controller 15 acquires, by functioning as the operation detector 24, the electrostatic capacitance map from the display unit 5, which is mapped by detecting (scanning) the electrostatic capacitances of all the sensors of the display unit 5. At the timing when the electrostatic capacitance map is acquired, the controller 15 causes the process to proceed to step S4.

Here, at the time of a contact operation, only the electrostatic capacitances in a portion where the contact operation is performed and an immediate vicinity of the portion exhibit large values, as indicated by being surrounded using a thick line in FIG. 6. In contrast, at the time of a non-contact operation, electrostatic capacitances in an area wider than that for a contact operation are changed to medium values, as indicated by being surrounded using a thick line in FIG. 7.

Figure 8A:
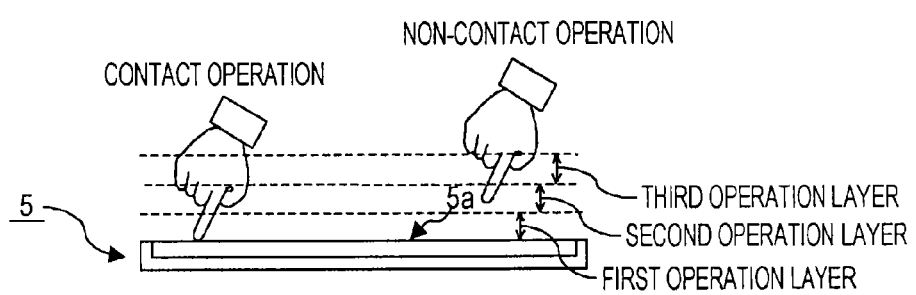
FIGS. 8A to 8C are diagrams for explaining a threshold for a contact operation and thresholds for individual operation layers in which a non-contact operation is performed for the cellular phone device according to the embodiment.
Figure 8B:
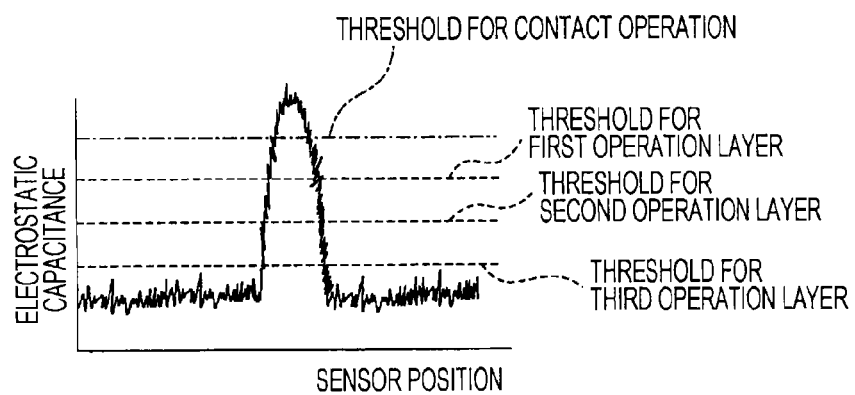

The controller 15 makes a determination as to whether the electrostatic capacitance map acquired in step S3 is an electrostatic capacitance map based on a contact operation or an electrostatic capacitance based on a non-contact operation illustrated in FIG. 8A, on the basis of whether or not an electrostatic capacitance equal to or greater than a threshold for a contact operation indicated by a one-dot chain line illustrated in FIG. 8B exists in all the electrostatic capacitances of the electrostatic capacitance map acquired in step S3.

Thus, when the controller 15 acquires the electrostatic capacitance map in step S3 and causes the process to proceed to step S4, the controller 15 compares, by functioning as the touch driver 21, each of the electrostatic capacitances of the acquired electrostatic capacitance map with the threshold for a contact operation indicated by the one-dot chain line in FIG. 8B. Then, the controller 15 determines whether or not an electrostatic capacitance equal to or greater than the threshold for a contact operation exists among the individual electrostatic capacitances forming the acquired electrostatic capacitance map.

The state where an electrostatic capacitance equal to or greater than the threshold for a contact operation exists among the individual electrostatic capacitances forming the acquired electrostatic capacitance map means that an operator is currently performing the contact operation illustrated in FIG. 8A. Thus, in this case, the controller 15 causes the process to proceed to step S5, and performs, by functioning as the touch driver 21, control such that the acquired electrostatic capacitance map is stored into the storage area for contact operations in the map history register 20.

Meanwhile, the state where an electrostatic capacitance equal to or greater than the threshold for a contact operation does not exist among the individual electrostatic capacitances forming the acquired electrostatic capacitance map means that an operator is currently performing a non-contact operation illustrated in FIG. 8A. Thus, in this case, the controller 15 causes the process to proceed to step S21 of a flowchart in FIG. 9, for which a process will be described later, and performs, by functioning as the touch driver 21, control such that the acquired electrostatic capacitance map is stored into the storage area for non-contact operations in the map history register 20.

Next, the controller 15 detects a contact operation form on the basis of the transition pattern of individual electrostatic capacitances in a plurality of electrostatic capacitance maps stored in the storage area for contact operations in the map history register 20.

Thus, the controller 15 causes the process to proceed to step S6, and determines, by functioning as the touch driver 21, whether or not a certain number or more of electrostatic capacitance maps by which a contact operation form can be detected are stored in the storage area for contact operations in the map history register 20. If the controller 15 determines that the certain number or more of electrostatic capacitance maps are stored, the controller 15 causes the process to proceed to step S7. If the controller 15 determines that the certain number or more of electrostatic capacitance maps are not stored, the controller 15 causes the process to proceed to step S9.

In the case of the cellular phone device of this embodiment, during the execution of an application program, electrostatic capacitance maps are acquired from the display unit 5 with certain intervals. Thus, when the controller 15 determines that the certain number or more of electrostatic capacitance maps are not stored and causes the process to proceed to step S9, the controller 15 determines, by functioning as the operation detector 24 and determining whether or not the application program is currently being executed, whether or not detection of an electrostatic capacitance map is to be continuously performed.

Then, in the case where the controller 15 determines that acquisition of the next electrostatic capacitance map has been canceled, for example, in the case where a terminate operation for the currently running application program has been performed, the controller 15 ends the entire process of the flowchart illustrated in FIG. 5.

Meanwhile, if the controller 15 determines that detection of an electrostatic capacitance map is to be continuously performed, the controller 15 causes the process to return to step S3, and performs scanning of electrostatic capacitances of all the sensors on the display unit 5, as described above. Then, if the electrostatic capacitance map acquired by this scanning includes an electrostatic capacitance equal to or greater than the threshold for a contact operation, the controller 15 performs control such that the electrostatic capacitance map is stored into the storage area for contact operations in the map history register 16. Accordingly, electrostatic capacitance maps corresponding to contact operations are sequentially stored in the storage area for contact operations in the map history register 16.

Alternatively, if the electrostatic capacitance map acquired by the scanning includes an electrostatic capacitance smaller than the threshold for a contact operation, the controller 15 performs control such that the electrostatic capacitance map is stored into the storage area for non-contact operations in the map history register 16. Accordingly, electrostatic capacitance maps corresponding to non-contact operations are sequentially stored in the storage area for non-contact operations in the map history register 16.

Next, when the certain number or more of electrostatic capacitance maps by which a contact operation form can be detected are stored in the storage area for contact operations in the map history register 16 and the process proceeds to step S7, the controller 15 reads, by functioning as the touch driver 21, a plurality of electrostatic capacitance maps stored in the storage area for contact operations in the map history register 16.

Furthermore, in step S7, the controller 15 identifies, by functioning as an operation position detector 27 of the operation detector 24, the locations on the display unit 5 of sensors having electrostatic capacitances equal to or greater than the threshold for a contact operation, on the basis of the individual electrostatic capacitance maps read from the map history register 16. Then, the controller 15 forms two-dimensional coordinates information (coordinates information of the X-axis and the Y-axis) corresponding to the identified locations on the display unit 5 of the sensors having electrostatic capacitances equal to or greater than the threshold for a contact operation.

Specifically, at the time of a contact operation, a portion on the display unit 5 in which the contact operation is performed, which is indicated by being surrounded by a thick-line frame in FIG. 6, has high electrostatic capacitances equal to or greater than the threshold for a contact operation, compared to a portion at which the contact operation is not performed.

Thus, the controller 15 identifies, for each electrostatic capacitance map, such locations on the display unit 5 of sensors indicating high electrostatic capacitances equal to or greater than the threshold for a contact operation, and forms the two-dimensional coordinates information corresponding to the location on the display unit 5 of the sensor at the center of the identified individual sensors each having an electrostatic capacitance equal to or greater than the threshold for a contact operation.

Furthermore, in step S7, the controller 15 detects the contact operation form (gesture) of the contact operation performed by the operator, on the basis of the transition pattern of individual pieces of two-dimensional coordinates information detected for each electrostatic capacitance map.

Then, the controller 15 causes the process to proceed to step S8, and performs, by functioning as the application execution controller 23, execution control for an information process corresponding to the detected contact operation form by the operator and the individual pieces of two-dimensional coordinates information used for detecting the contact operation form among information processes of the currently running application program.

Accordingly, the operation corresponding to the contact operation by the operator is subjected to execution control by the controller 15, on the basis of the currently running application program.

Furthermore, for performing an information process of the currently running application program, the controller 15 writes, by functioning as the display controller 25 of the framework unit 22 according to need, a display object (a still image, a moving image, etc.) to a buffer memory 28 and displays the display object on the display unit 5.

Accordingly, a display object corresponding to each process of the currently running application program is displayed on the display unit 5.

Furthermore, in step S8, the controller 15 performs drive control for the vibration unit 9 provided at the position corresponding to each piece of two-dimensional coordinates information among the vibration units 9 arranged in the casing as illustrated in FIG. 2.

In the case of a non-contact operation, since a finger is not in contact with the display unit 5, it is difficult to directly apply vibration of the vibration unit 9 to the finger used for the operation to notify the operator of the operation position.

However, in the case of the cellular phone device of this embodiment, by performing drive control for the vibration unit 9 provided at a position corresponding to each piece of two-dimensional coordinates information, the operator can be informed of the position on the display unit 5 at which a non-contact operation has been performed, by way of the hand carrying the casing.

Next, when it is determined in step S4 that the electrostatic capacitance map acquired from the display unit 5 includes an electrostatic capacitance smaller than the threshold for a contact operation and the process proceeds to step S21 in FIG. 9, the controller 15 performs control such that the electrostatic capacitance map is stored into the storage area for non-contact operations in the map history register 16 and causes the process to proceed to step S22.

Next, the controller 15 detects, by comparing the transition pattern of electrostatic capacitances of a plurality of electrostatic capacitance maps stored in the storage area for non-contact operations in the map history register 20 with the transition pattern of an electrostatic capacitance map for each non-contact operation form used for the currently running application program, which is represented by the non-contact operation form file loaded into the non-contact operation form file memory 17, a non-contact operation form, a non-contact operation position, and a non-contact operation layer.

Thus, the controller 15 causes the process to proceed to step S22, and determines, by functioning as the touch driver 21, whether or not a certain number or more of electrostatic capacitance maps by which a non-contact operation form and the like can be detected are stored in the storage area for non-contact operations in the map history register 20. Then, if the controller 15 determines that the certain number or more of electrostatic capacitance maps are stored, the controller 15 causes the process to proceed to step S23. If the controller 15 determines that the certain number or more of electrostatic capacitance maps are not stored, the controller 15 causes the process to proceed to step S9 of the flowchart in FIG. 5.

In the case of the cellular phone device of this embodiment, since electrostatic capacitance maps are acquired from the display unit 5 with certain intervals during the execution of an application program, as described above. Thus, when it is determined that the certain number or more of electrostatic capacitance maps are not stored and the process proceeds to step S9 of the flowchart in FIG. 5, the controller 15 determines, by functioning as the operation detector 24 and determining whether or not an application program is currently running, whether or not detection of an electrostatic capacitance map is to be continuously performed.

Then, in the case where the controller 15 determines that acquisition of the next electrostatic capacitance map has been canceled, for example, in the case where a terminate operation for the currently running application program has been performed, the controller 15 ends the entire processes of the flowcharts illustrated in FIGS. 5 and 9.

Meanwhile, when the controller 15 determines that detection of an electrostatic capacitance map is to be continuously performed, the controller 15 causes the process to return to step S3 and performs scanning of the electrostatic capacitances of all the sensors on the display unit 5, as described above. Then, if the electrostatic capacitance map acquired by this scanning includes an electrostatic capacitance smaller than the threshold for a contact operation, control is performed such that the electrostatic capacitance map is stored into the storage area for non-contact operations in the map history register 16. Accordingly, electrostatic capacitance maps corresponding to non-contact operations are sequentially stored in the storage area for non-contact operations in the map history register 16.

Alternatively, if the electrostatic capacitance map acquired by the scanning includes an electrostatic capacitance equal to or greater than the threshold for a contact operation, control is performed such that the electrostatic capacitance map is stored into the storage area for contact operations in the map history register 16. Accordingly, electrostatic capacitance maps corresponding to contact operations are sequentially stored in the storage area for contact operations in the map history register 16.

Next, when the certain number or more of electrostatic capacitance maps by which a non-contact operation form and the like can be detected are stored in the storage area for non-contact operations in the map history register 16 and the process proceeds to step S23, the controller 15 reads, by functioning as the touch driver 21, a plurality of electrostatic capacitance maps stored in the storage area for non-contact operations in the map history register 16.

Furthermore, in step S23, the controller 15 identifies, by functioning as the operation position detector 27 of the operation detector 24, the locations on the display unit 5 of sensors having electrostatic capacitances smaller than the threshold for a contact operation for each electrostatic capacitance map read from the map history register 16. Then, the controller 15 detects the transition pattern of the identified locations on the display unit 5 of the sensors having electrostatic capacitances smaller than the threshold for a contact operation.

Specifically, at the time of a non-contact operation, the electrostatic capacitances of portions corresponding to the non-contact operation on the display unit 5 in an area wider than that for a contact operation are changed to medium values, as indicated by being surrounded by a thick-line frame in FIG. 7.

Thus, the controller 15 detects, by identifying such locations on the display unit 5 of sensors indicating electrostatic capacitances smaller than the threshold for a contact operation for each electrostatic capacitance map, the transition pattern of electrostatic capacitances corresponding to the non-contact operation by the operator.

Next, the controller 15 causes the process to proceed to step S24, and detects, by functioning as an operation layer detector 26 of the operation detector 24, a non-contact operation layer in which a non-contact operation is performed by the operator, on the basis of, for example, the individual electrostatic capacitances indicated by being surrounded using the thick line in FIG. 7 used for identifying the non-contact operation form.

Specifically, at the time of a non-contact operation, an electrostatic capacitance detected by an electrostatic capacitance sensor of the display unit 5 changes in accordance with the distance between a finger (operating element) of an operator and the electrostatic capacitance sensor. The controller 15 virtually sets a certain electrostatic capacitance range as a first operation layer, as illustrated in FIG. 8A. The controller 15 also virtually sets a certain electrostatic capacitance range that is different from the electrostatic capacitance range for the first operation layer as a second operation layer, as illustrated in FIG. 8A. The controller 15 also virtually sets a certain electrostatic capacitance range that is different from the electrostatic capacitance ranges for the first operation layer and the second operation layer as a third operation layer, as illustrated in FIG. 8A.

In other words, the controller 15 virtually sets each of the operation layers in accordance with the distance from an electrostatic capacitance sensor.

At the time of a non-contact operation, the controller 15 displays a first operation layer object, a second operation layer object, and a third operation layer object corresponding to the individual operation layers on the display unit 5, and performs switch control for the display form of an operation layer object corresponding to an electrostatic capacitance detected by an electrostatic capacitance sensor of the display unit 5, among the three operation layer objects.

In other words, the controller 15 performs switch control for the display form of each operation layer object displayed on the display unit 5 in such a manner that an operator is able to recognize the operation layer for the non-contact operation detected on the basis of the electrostatic capacitance.

Detection of an operation layer in which a non-contact operation is performed is made on the basis of a threshold for each operation layer. A threshold for the first operation layer, which is the operation layer closest to the display unit 5, is set to a value smaller than the threshold for a contact operation and equal to or greater than a threshold serving as the upper limit of the second operation layer, as illustrated in FIG. 8B.

Similarly, a threshold for the second operation layer, which is the operation layer the second closest to the display unit 5, is set to a value smaller than the threshold serving as the lower limit of the first operation layer and equal to or greater than a threshold serving as the upper limit of the third operation layer, as illustrated in FIG. 8B.

Similarly, a threshold for the third operation layer, which is the operation layer farthest away from the display unit 5, is set to a value within a certain range smaller than the threshold serving as the lower limit of the second operation layer, as illustrated in FIG. 8B.

Figure 8C:
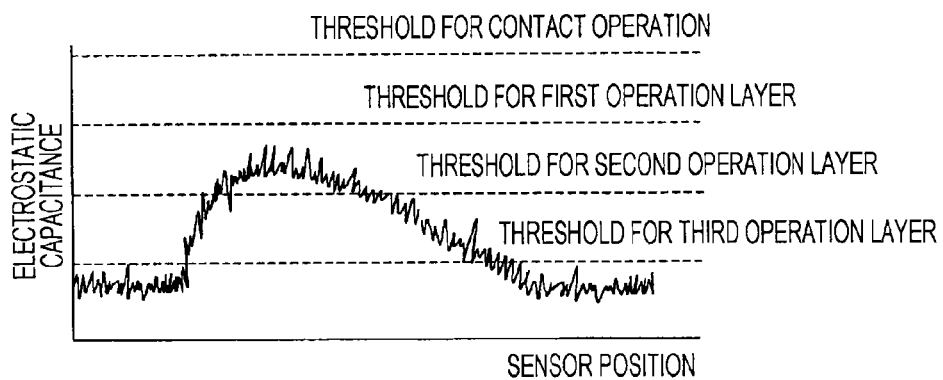

When the operator performs a non-contact operation, electrostatic capacitances of portions on the display unit 5 corresponding to the non-contact operation in an area wider than that for a contact operation are changed to medium values, as explained with reference to FIG. 7. Thus, regarding electrostatic capacitances detected from an electrostatic capacitance map at the time of a non-contact operation, an electrostatic capacitance equal to or smaller than the threshold for a contact operation is detected in a wide area, as illustrated in FIG. 8C.

The controller 15 detects, by comparing each electrostatic capacitance of each electrostatic capacitance map with a threshold for each operation layer, a non-contact operation layer in which a non-contact operation is performed by the operator. For example, in the case where an electrostatic capacitance of a certain electrostatic capacitance map exhibits a value between the threshold serving as the upper limit of the third operation layer and the threshold serving as the upper limit of the second operation layer, the controller 15 determines that the operator is currently performing a non-contact operation in the second operation layer.

In step S24, the controller 15 compares, by functioning as the operation position detector 27 of the operation detector 24, the transition pattern of electrostatic capacitances corresponding to the non-contact operation by the operator detected in step S23 with the transition pattern of electrostatic capacitances of each non-contact operation form used in the currently running application program indicated by the non-contact operation form file stored in the non-contact operation form file memory 17.

Then, the controller 15 identifies, by detecting the transition pattern of electrostatic capacitances corresponding to the non-contact operation by the operator detected in step S23 among individual transition patterns of electrostatic capacitances indicated by the non-contact operation form file stored in the non-contact operation form file memory 17, the non-contact operation form corresponding to the transition pattern of electrostatic capacitances of the non-contact operation by the operator detected in step S23.

Figure 10A:
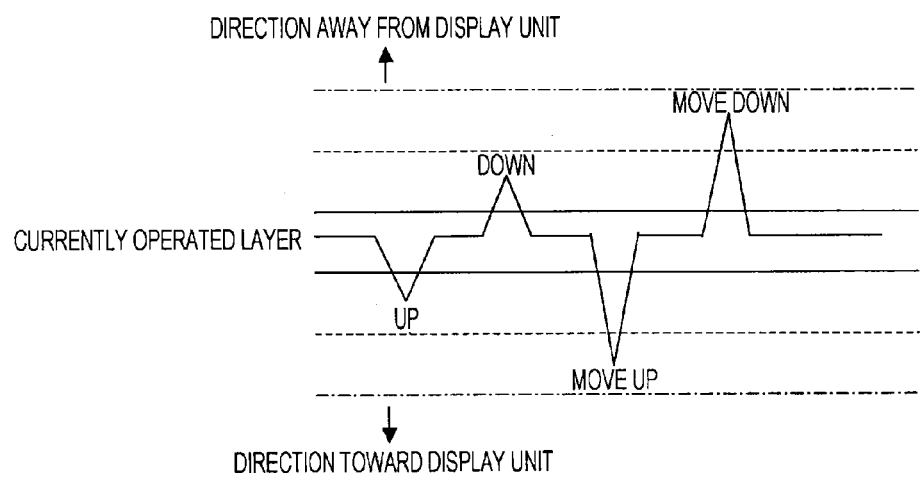
FIGS. 10A and 10B include diagrams illustrating operation patterns of a non-contact operation and electrostatic capacitances corresponding to the individual operation patterns for the cellular phone device according to the embodiment.
Figure 10B:
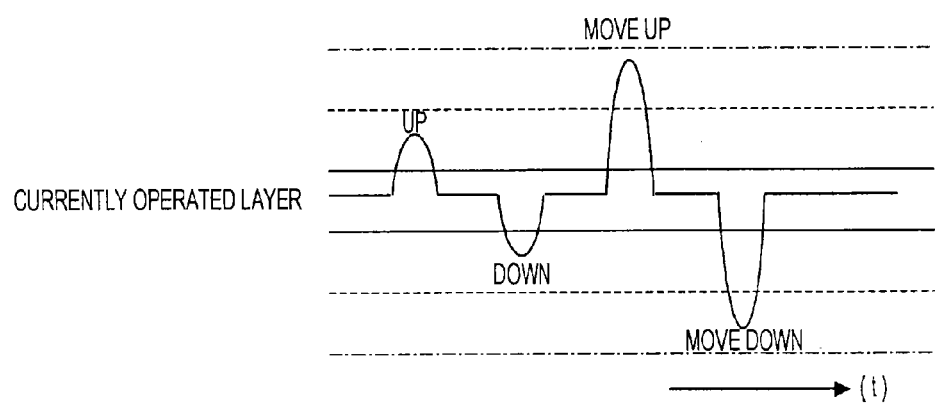

FIG. 10A illustrates an example of non-contact operation forms by an operator, and FIG. 10B illustrates an example of electrostatic capacitances detected in accordance with individual non-contact operation forms.

When, as illustrated in FIG. 10A, an operator moves a finger (control) placed in an intermediate layer in the direction toward the display unit 5 by one layer, an electrostatic capacitance increased by an amount of the approach of the finger of the operator to the display unit 5 is detected (Up), as illustrated in FIG. 10B.

On the contrary, when, as illustrated in FIG. 10A, the operator moves the finger (control) placed in the intermediate layer in the direction away from the display unit 5 by one layer, an electrostatic capacitance decreased by an amount of the retreat of the finger of the operator from the display unit 5 is detected (Down), as illustrated in FIG. 10B.

Furthermore, when, as illustrated in FIG. 10A, the operator greatly moves the finger (control) placed in the intermediate layer in the direction toward the display unit 5 by two layers, an electrostatic capacitance further increased by an amount of the further approach of the finger of the operator to the display unit 5 is detected (Move Up), as illustrated in FIG. 10B.

On the contrary, when, as illustrated in FIG. 10A, the operator moves the finger (control) placed in the intermediate layer in the direction away from the display unit 5 by two layers, an electrostatic capacitance further decreased by an amount of the further retreat of the finger of the operator from the display unit 5 is detected (Move down), as illustrated in FIG. 10B.

The controller 15 detects such a non-contact operation form by comparing each transition pattern of electrostatic capacitances indicated by the non-contact operation form file stored in the non-contact operation form file memory 17 with the transition pattern of electrostatic capacitances corresponding to the non-contact operation by the operator detected in step S23.

Furthermore, in step S24, the controller 15 detects, by functioning as the operation position detector 27, for example, for each electrostatic capacitance map, two-dimensional coordinates (=two-dimensional coordinates serving as the center of a non-contact operation) indicating the location on the display unit 5 of the sensor by which the electrostatic capacitance located at the center of the individual electrostatic capacitances indicated by being surrounded using the thick line in FIG. 7 used for identifying the non-contact operation form is detected. Then, the controller 15 detects, on the basis of the detected non-contact operation layer and the detected two-dimensional coordinates serving as the center of the non-contact operation, a two-dimensional non-contact operation position in the non-contact operation layer.

Next, the controller 15 causes the process to proceed to step S25 of the flowchart in FIG. 9, and determines whether or not the finger is in contact with the display unit 5 (presence or absence of assist touch).

That is, in the case where a contact operation is performed, since an operation is performed with a finger in contact with the display unit 5, the display unit 5 serves as a support for the finger that performs the contact operation. Meanwhile, in the case where a non-contact operation is performed, since a finger is not in contact with the display unit 5, the display unit 5 does not support the finger that performs the non-contact operation. Thus, there is a problem in that it is difficult to stabilize an operation position for a non-contact operation, compared to the case of a contact operation.

As described above, in the case of the cellular phone device of this embodiment, three non-contact operation layers are set. Thus, if an operation position in a non-contact operation is not stabilized, there is an inconvenience in that even when an operator intends to stop his/her finger in the same layer, the finger of the operator reciprocates between operation layers without the operator's consciousness.

Thus, in the case of the cellular phone device of this embodiment, for fixing an operation layer in which a non-contact operation is performed, an operator performs, using a finger of the hand carrying the cellular phone device, a contact operation for a desired portion of the display unit 5 (performs assist touch). In step S25, the controller 15 determines the presence or absence of such an assist touch. If the controller 15 determines that such an assist touch has been performed, the controller 15 performs a non-contact operation assist operation for fixing an operation layer in which a non-contact operation is performed. The details of the non-contact operation assist operation will be described later.

Meanwhile, if the controller 15 determines in step S25 that such an assist touch has not been performed, the controller 15 causes the process to proceed to step S26.

In step S26, the controller 15 performs execution control for a process corresponding to the non-contact operation form, the non-contact operation layer, and the non-contact operation position in the non-contact operation layer detected in step S24 among individual processes of the currently running application program, and causes the process to return to step S9 of the flowchart in FIG. 5.

Accordingly, the operation corresponding to the three-dimensional non-contact operation by the operator is subjected to execution control by the controller 15, on the basis of the currently running application program.

Furthermore, for performing an information process of the currently running application program, the controller 15 writes, by functioning as the display controller 25 of the framework unit 22 according to need, a display object (a still image, a moving image, etc.) into the buffer memory 28 and displays the display object on the display unit 5. Accordingly, the display object corresponding to the process for the non-contact operation of the currently running application program is displayed on the display unit 5.

Furthermore, in step S25, the controller 15 performs drive control for the vibration unit 9 provided at a position in the casing corresponding to the non-contact operation among the individual vibration units 9 arranged in the casing as illustrated in FIG. 2.

In the case of a non-contact operation, a finger is not in contact with the display unit 5. Thus, it is difficult to directly apply the vibration of the vibration unit 9 to the finger used for the operation to notify the operator of the operation position.

However, in the case of the cellular phone device of this embodiment, by performing drive control for the vibration unit 9 provided at the position corresponding to each two-dimensional coordinates information, the operator can be informed, via the hand carrying the casing, of the position on the display unit 5 at which a non-contact operation has been performed.

Next, as an example, a non-contact operation based on an application program that is capable of selecting a desired file of a plurality of files stored in a desired non-contact operation layer and moving the selected file to another non-contact operation layer will be explained.

The controller 15 performs, by functioning as the application execution controller 23 on the basis of the application program, control such that layer information indicating a layer in which each file is stored, information on the status (active/inactive), and the like are written into and read from the layer information memory 18 illustrated in FIGS. 1 and 2.

Figure 11A:
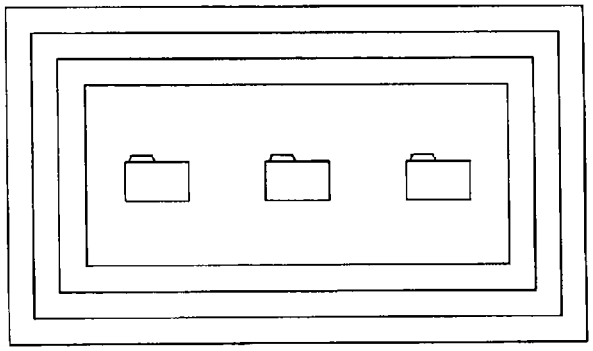
FIGS. 11A to 11C include diagrams illustrating a display example of display objects corresponding to a desired file selecting operation based on a three-dimensional non-contact operation for the cellular phone device according to the embodiment.
Figure 12A:
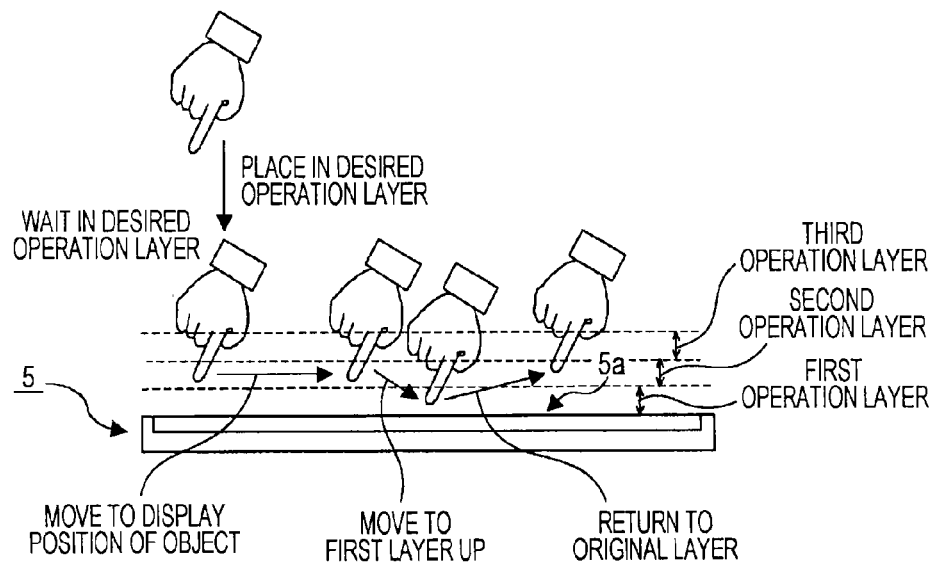
FIGS. 12A and 12 B include diagrams illustrating three-dimensional non-contact operation forms when a desired file selecting operation is performed for the cellular phone device according to the embodiment and electrostatic capacitances corresponding to the individual non-contact operations.

First, in the case where, for example, three files are stored in the second operation layer as illustrated in FIG. 11A and an operator selects the middle file of the three files, the operator moves his/her finger from outside of operation layers to the second operation layer and waits in this state until a certain period of time, for example, two seconds, has passed, as illustrated in FIG. 12A.

When detecting that the certain period of time has passed since stop of the finger in any of the operation layers, the controller 15 recognizes that the operation layer in which the finger is located has been selected by the operator, and detects a file stored in association with the second operation layer, in accordance with the layer information of individual files stored in the layer information memory 18.

Figure 11B:
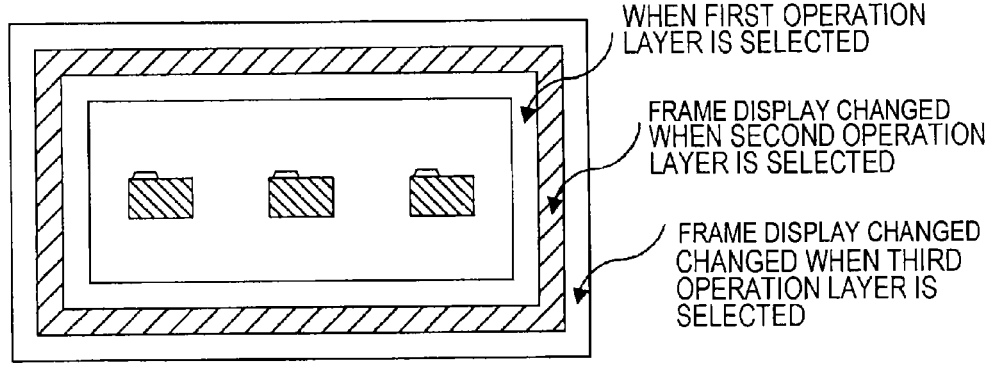

Then, the controller 15 performs control such that an icon indicating the file stored in association with the second operation layer is displayed on the display unit 5, as illustrated in FIG. 11B.

Furthermore, the controller 15 displays three frames so as to surround icons of the individual files. Among the three frames, the innermost frame is a frame corresponding to the first operation layer, the outermost frame is a frame corresponding to the third operation layer, and the frame located between the frame for the first operation layer and the frame for the third operation layer is a frame corresponding to the second operation layer.

This example is a case where the second operation layer is selected by an operator. Thus, the controller 15 performs change control for the display form, such as the display color and display brightness, of the frame corresponding to the second operation layer, as illustrated in FIG. 11B, and informs the operator that the second operation layer is currently selected.

Furthermore, the controller 15 performs change control for the display form, such as the display color and display brightness, of icons of individual files stored in association with the second operation layer, as illustrated in FIG. 11B, and informs the operator of files in an active state stored in the second operation layer.

Next, the operator two-dimensionally moves his/her finger to the display position of the icon of a file to be selected in the selected second operation layer, as illustrated in FIG. 12A. Then, the operator performs a non-contact operation in which the finger, which is moved to the display position of the icon of the file to be selected, is once moved to the first operation layer and is returned to the second operation layer.

Figure 12B:
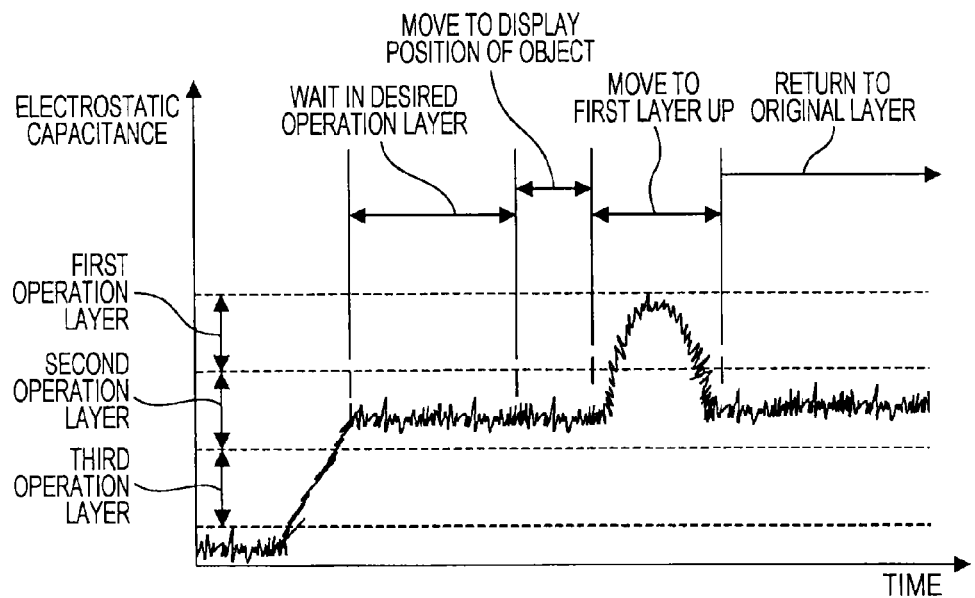

FIG. 12B illustrates a change in the electrostatic capacitance corresponding to such a non-contact operation. As is clear from FIG. 12B, by moving the finger from the outside of the operation layers to the second operation layer, the electrostatic capacitance corresponding to the second operation layer is detected. Furthermore, during a certain period of time in which the finger is stopped in the second operation layer and then during the period in which the finger is moved to the display position of the icon of a desired file, the electrostatic capacitance corresponding to the second operation layer is detected.

Then, by moving the finger from the second operation layer to the first operation layer and returning the finger from the first operation layer to the second operation layer, the electrostatic capacitance corresponding to the first operation layer is detected during the period in which the finger is moved to the first operation layer.

Figure 11C:
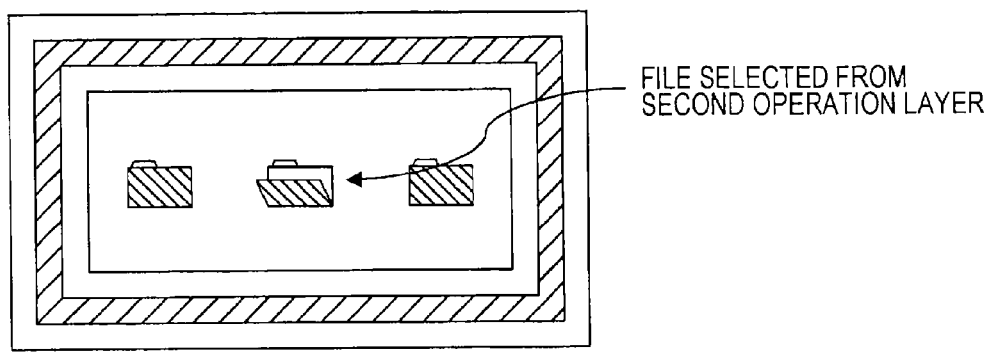

When such a change in the electrostatic capacitance is found, the controller 15 recognizes that the file displayed at the position on the display unit 5 at which the operator moves his/her finger from the second operation layer to the first operation layer is selected. Then, for example, as illustrated in FIG. 11C, by performing change control for the display form of the icon of the selected file, the controller 15 informs the operator of the selected file.

Furthermore, by performing drive control for the vibration unit 9 corresponding to the display position of the selected file, the controller 15 informs the operator of selection of the file.

Figure 13A:
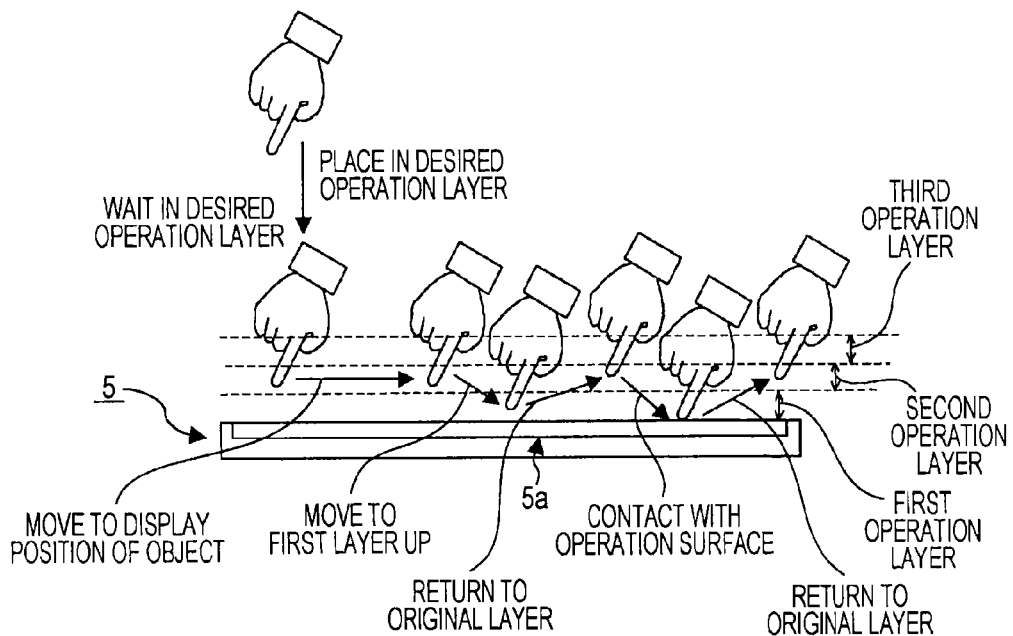
FIGS. 13A and 13B include diagrams illustrating three-dimensional non-contact operation forms when an operation for moving a desired file between operation layers for the cellular phone device according to the embodiment and electrostatic capacitances corresponding to the individual non-contact operations.

Next, in the case where the file selected in the second operation layer is moved to the first operation layer, the operator makes the finger, which has been returned to the second operation layer after selection of the file, to be in contact with the operation surface part 5a of the display unit 5 and then returns the finger to the second operation layer, as illustrated in FIG. 13A.

Figure 13B:
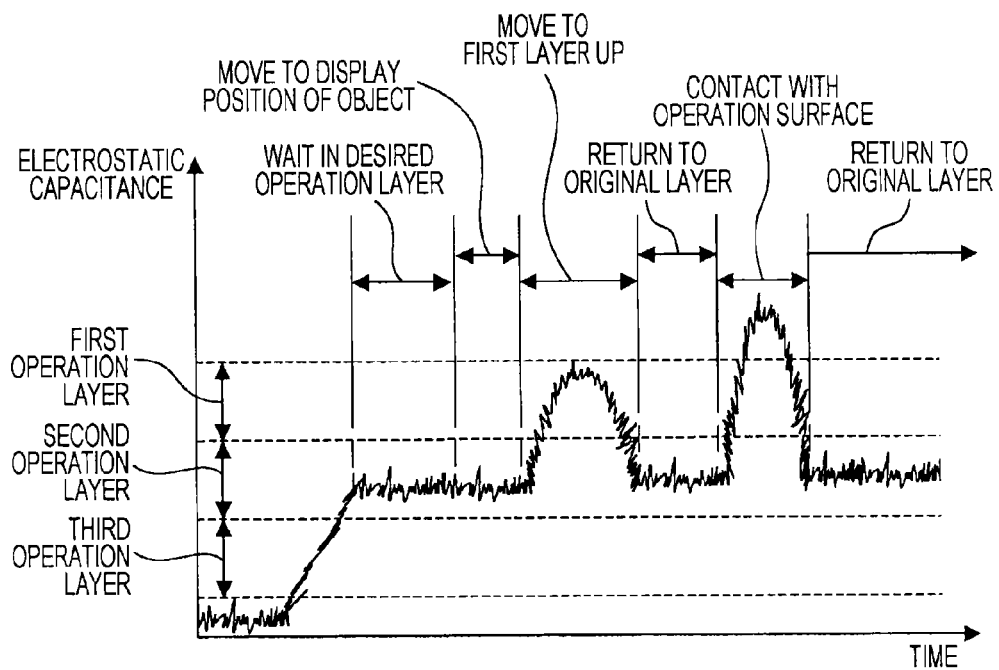

The electrostatic capacitance detected by this operation exhibits a value equal to or greater than the threshold for a contact operation and then exhibits a value corresponding to the second operation layer, as illustrated in FIG. 13B.

Figure 14A:
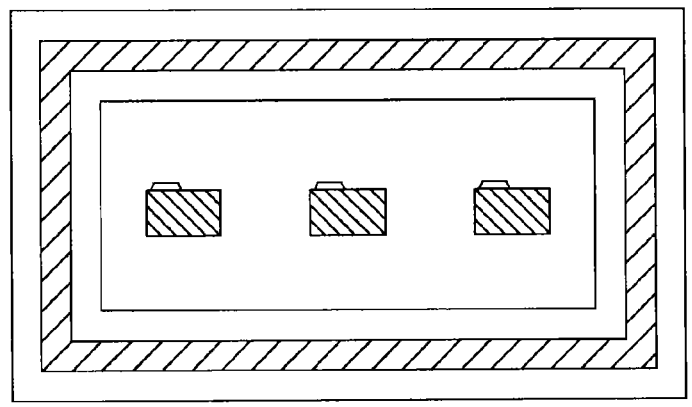
FIGS. 14A to 14C include diagrams illustrating a display example of display objects corresponding to an operation for moving a desired file between operation layers for the cellular phone device according to the embodiment.
Figure 14B:
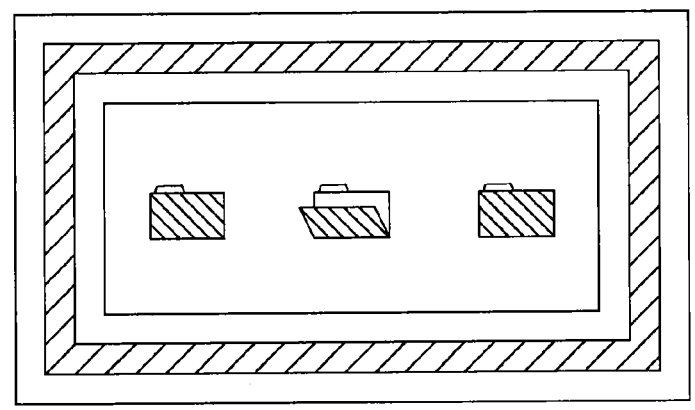
Figure 14C:
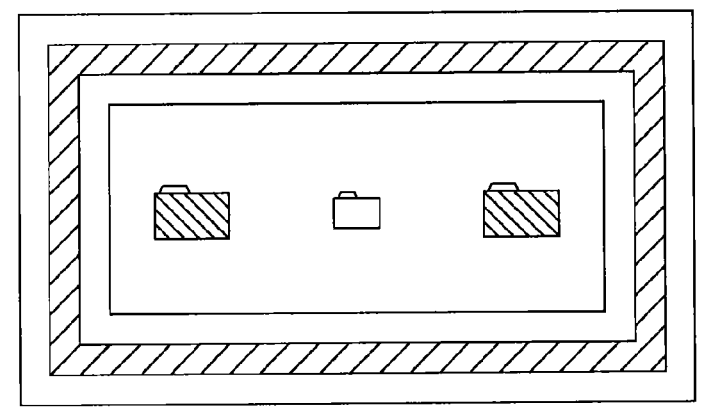

When such a change in the electrostatic capacitance is found, the controller 15 recognizes that an instruction for moving the file selected in the second operation layer to the first operation layer is currently issued, as illustrated in FIGS. 14A and 14B. Then, for example, as illustrated in FIG. 14C, the controller 15 performs change control for the display form such that the icon of the file for which the instruction for the movement has been issued is displayed in a reduced size and informs, by performing drive control for the vibration unit 9 corresponding to the display position of the moved file, the operator of the movement of the file.

Furthermore, the controller 15 rewrites layer information and status information in the layer information memory 18 in accordance with such a movement of the file between operation layers.

Next, in the case where the file selected in the second operation layer is moved to the third operation layer, the operator moves his/her finger, which has been returned to the second operation layer after selection of the file, to outside of the third operation layer in the direction away from the display unit 5, and then returns the finger to the second operation layer.

Figure 15A:
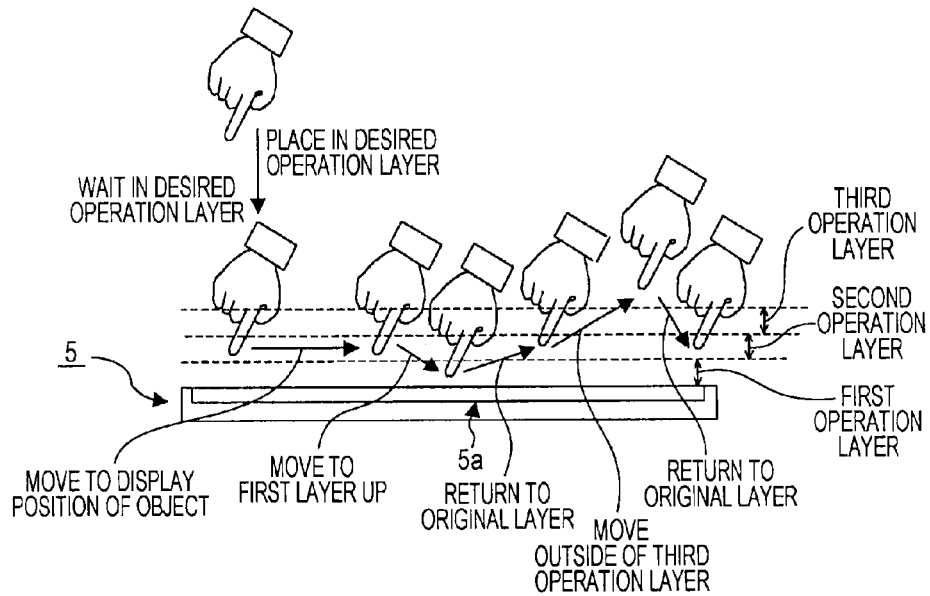
FIGS. 15A and 15B include diagrams illustrating other three-dimensional non-contact operation forms when an operation for moving a desired file between operation layers for the cellular phone device according to the embodiment and electrostatic capacitances corresponding to the individual non-contact operations.
Figure 15B:
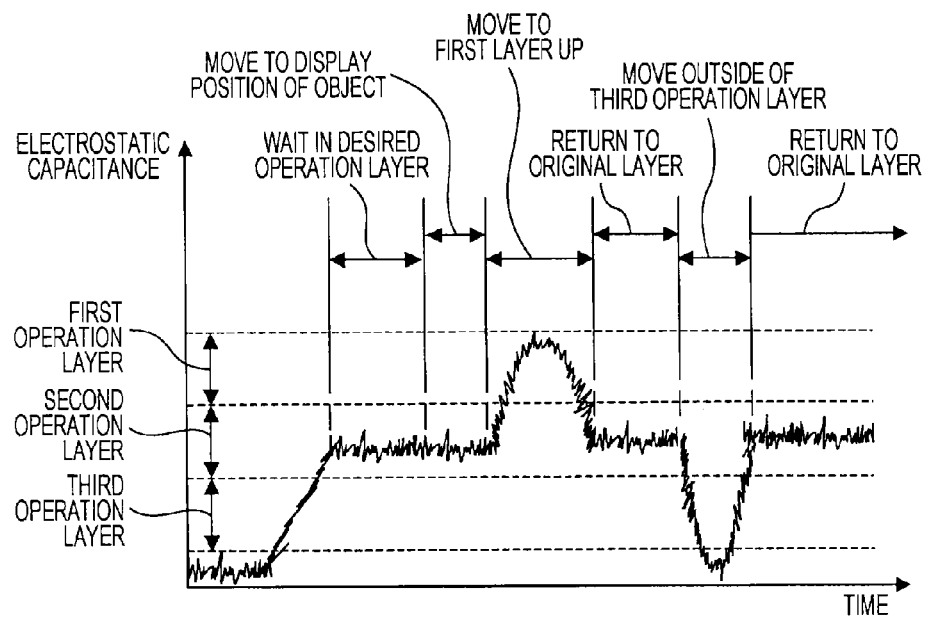

The electrostatic capacitance detected in this operation exhibits a value smaller than the electrostatic capacitance detected in the third operation layer and then exhibits a value corresponding to the second operation layer, as illustrated in FIG. 15B.

Figure 16A:
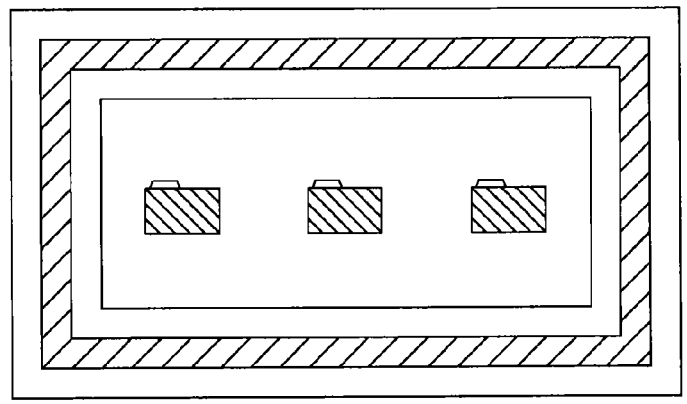
FIGS. 16A to 16C include diagrams illustrating a display example of display objects corresponding to another operation for moving a desired file between operation layers for the cellular phone device according to the embodiment.
Figure 16B:
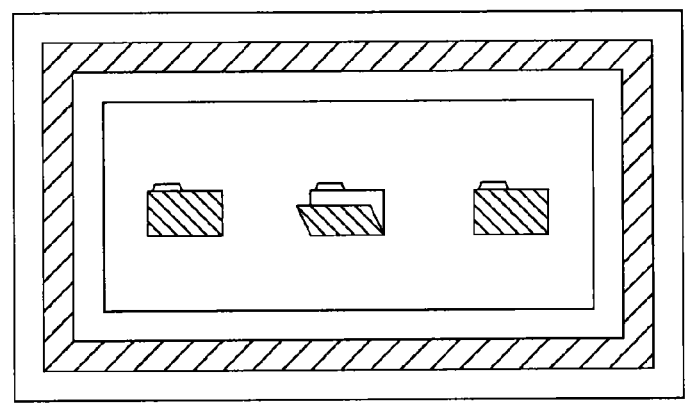
Figure 16C:
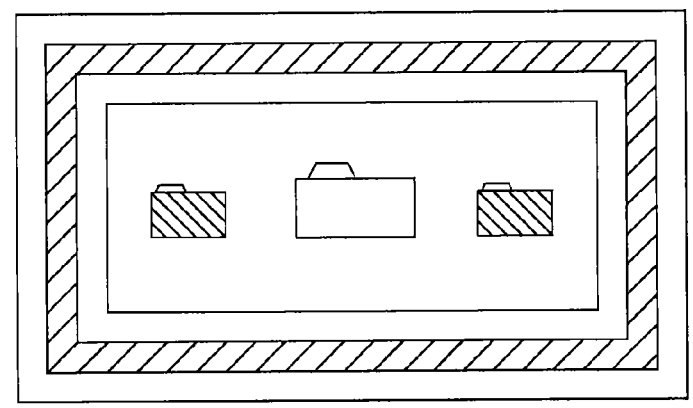

When such a change in the electrostatic capacitance is found, the controller 15 recognizes that an instruction for moving the file selected in the second operation layer to the third operation layer is currently issued, as illustrated in FIGS. 16A and 16B. Then, for example, as illustrated in FIG. 16C, the controller 15 performs change control for the display form such that the icon of the file for which the instruction for the movement has been issued is displayed in an increased size and informs, by performing drive control for the vibration unit 9 corresponding to the display position of the moved file, the operator of the movement of the file.

Furthermore, the controller 15 rewrites layer information and status information in the layer information memory 18 in accordance with such a movement of the file between operation layers.

Assist Operation for Non-contact Operation

Next, if the controller 15 determines in step S25 of the flowchart in FIG. 9 that the assist touch has been performed, the controller 15 causes the process to proceed to step S27, and performs execution control for a process corresponding to the non-contact operation form, the non-contact operation layer, and the non-contact operation position in the non-contact operation layer detected in step S24 while locking the movement between the non-contact operation layers.

That is, as described above, for a non-contact operation, the display unit 5 does not support a finger that performs a non-contact operation. Thus, there is a problem in that it is difficult to stabilize an operation position, compared to a contact operation.

Thus, in the case where the operator wants to fix the operation layer in which the non-contact operation is performed, the operator performs "assist touch" in which the operator performs a contact operation, using a finger of the hand that carries the cellular phone device, on a desired portion of the display unit 5.

During a period in which the assist touch is being detected in the process of a non-contact operation, the controller 15 locks the operation layer for the non-contact operation to the operation layer in which the non-contact operation is currently performed.

In other words, during the period in which the assist touch is being detected in the process of a non-contact operation, the controller 15 cancels an operation for moving the layer in which the non-contact operation is performed to another operation layer.

In other words, the controller 15 performs an information process while fixing the layer in which the non-contact operation is performed to the layer in which the non-contact operation is currently performed.

Accordingly, since a non-contact operation layer in which a non-contact operation is performed can be fixed, a stable non-contact operation can be performed.

FIG. 17 illustrates the details of an information process in the case where the assist touch has not been performed and the details of an information process in the case where the assist touch has been performed, in various non-contact operations.

For example, in the case of the cellular phone device of this embodiment, seven types of non-contact operations, a "layer-up operation", a "layer-down operation", a "drag operation", an "inter-layer up operation", a "move-up operation", an "inter-layer down operation", and a "move-down operation", can be performed as non-contact operations, as illustrated in FIG. 17.

The operation attribute of the "layer-up operation" is a three-dimensional touch event. By detecting that a certain period of time has passed since stop of a finger moved to an upper layer, the controller 15 recognizes that the layer-up operation has been performed.

Specifically, when, for example, a non-contact operation is performed in the second operation layer, by moving the finger to the first operation layer, which is an upper layer, and detecting that a certain period of time has passed in this state, the controller 15 recognizes that the layer-up operation has been performed.

In the case where the layer-up operation is detected, if the controller 15 determines that an assist-touch operation has not been performed, the controller 15 moves the effective layer to an upper layer (a layer in which a non-contact operation is accepted is set to an upper layer corresponding to the layer-up operation) in accordance with the layer-up operation, and changes the display form of the frame corresponding to the effective layer and the display form of an icon existing in the effective layer, as illustrated in FIG. 11B.

Meanwhile, in the case where the layer-up operation is detected, if the controller 15 determines that an assist-touch operation has been performed, the controller 15 cancels the layer-up operation. Then, the controller 15 fixes the layer in which a non-contact operation is to be performed to the original non-contact operation layer in which the non-contact operation was performed before the execution of the layer-up operation.

Accordingly, since the non-contact operation layer in which a non-contact operation is performed can be fixed, a stable non-contact operation can be performed.

Next, the operation attribute of the "layer-down operation" is a three-dimensional touch event. By detecting that a certain period of time has passed since stop of a finger moved to a lower layer, the controller 15 recognizes that the layer-down operation has been performed.

Specifically, when, for example, a non-contact operation is performed in the second operation layer, by moving the finger to the third operation layer, which is a lower layer, and detecting that the certain period of time has passed in this state, the controller 15 recognizes that the layer-down operation has been performed.

In the case where the layer-down operation is detected, if the controller 15 determines that an assist-touch operation has not been performed, the controller 15 moves the effective layer to a lower layer (the layer in which a non-contact operation is accepted is set to a lower layer corresponding to the layer-down operation) in accordance with the layer-down operation, and changes the display form of the frame corresponding to the effective layer and the display form of an icon existing in the effective layer, as illustrated in FIG. 11B.

Meanwhile, in the case where the layer-down operation is detected, if the controller 15 determines that an assist-touch operation has been performed, the controller 15 cancels the layer-down operation. Then, the controller 15 fixes the layer in which a non-contact operation is to be performed to the original non-contact operation layer in which the non-contact operation was performed before the execution of the layer-down operation.

Accordingly, since the non-contact operation layer in which a non-contact operation is performed can be fixed, a stable non-contact operation can be performed.

Next, the operation attribute of the "drag operation" is a three-dimensional touch event. When detecting that a finger is moved in a two-dimensional direction or a three-dimensional direction with an operation target, such as a desired icon, selected, the controller 15 recognizes that the drag operation has been performed.

Specifically, when, for example, a non-contact operation is performed in the second operation layer, by detecting that a finger is moved to another position in the second operation layer or the finger is moved to the first operation layer or the third operation layer with any icon selected, the controller 15 recognizes that the drag operation has been performed.

In the case where the drag operation is detected, if the controller 15 determines that an assist-touch operation has not been performed, the controller 15 performs control such that the display position of the selected icon is moved to the second-dimensional direction or performs control such that the display position of the selected icon to another layer, in accordance with the drag operation.

Meanwhile, in the case where the drag operation is detected, if the controller 15 determines that an assist-touch operation has been performed, the controller 15 accepts only a drag operation in the two-dimensional direction and cancels a drag operation in the three-dimensional direction.

That is, the controller 15 accepts a drag operation within the layer in which the non-contact operation is currently performed.

Accordingly, since the non-contact operation layer in which a non-contact operation is performed can be fixed, a stable non-contact operation can be performed.

Next, the operation attribute of the "inter-layer up operation" is a two-dimensional touch event. In the case where the controller 15 detects that an operation for moving a finger in the direction toward the display unit 5 in the layer in which the non-contact operation is currently performed and for increasing the detected electrostatic capacitance by a certain amount, the controller 15 recognizes that the inter-layer up operation has been performed.

In the case where the inter-layer up operation is detected, if the controller 15 determines that an assist-touch operation has not been performed, the controller 15 treats the operation as execution of tap input for the icon selected in the inter-layer up operation.

Furthermore, in the case where the inter-layer up operation is detected, if the controller 15 determines that an assist-touch operation has been performed, similarly, the controller 15 treats the operation as execution of tap input for the icon selected in the inter-layer up operation.

Accordingly, since the non-contact operation layer in which a non-contact operation is performed can be fixed, a stable non-contact operation can be performed.

Next, the operation attribute of the "move-up operation" is a three-dimensional touch event. In a state where a desired icon is selected, by detecting that the selected icon is moved to the second layer up from the current layer, the controller 15 recognizes that the move-up operation has been performed.

Specifically, for example, in a state where a non-contact operation is performed in the third operation layer and a desired icon is selected, when the selected icon is moved to the first operation layer, which is the second layer up from the current layer, the controller 15 recognizes that the move-up operation has been performed.

In the case where the move-up operation is detected, if the controller 15 determines that an assist-touch operation has not been performed, the controller 15 moves the selected icon to the second layer up from the current layer in accordance with the move-up operation.

Meanwhile, in the case where the move-up operation is detected, if the controller 15 determines that an assist-touch operation has been performed, the controller 15 cancels the move-up operation. Then, the controller 15 fixes the layer in which a non-contact operation is to be performed to the original non-contact operation layer in which the non-contact operation was performed before the execution of the move-up operation.

Accordingly, since the non-contact operation layer in which a non-contact operation is performed can be fixed, a stable non-contact operation can be performed.

Next, the operation attribute of the "inter-layer down operation" is a two-dimensional touch event. In the case where the controller 15 detects that an operation for moving a finger in the direction away from the display unit 5 in the layer in which the non-contact operation is currently performed and for decreasing the detected electrostatic capacitance by a certain amount, the controller 15 recognizes that the inter-layer down operation has been performed.

In the case where the inter-layer down operation is detected, if the controller 15 determines that an assist-touch operation has not been performed, the controller 15 treats the operation as selection of the icon corresponding to the inter-layer down operation.

Furthermore, in the case where the inter-layer down operation is detected, if the controller 15 determines that an assist-touch operation has been performed, similarly, the controller 15 treats the operation as selection of the icon corresponding to the inter-layer down operation.

Accordingly, since the non-contact operation layer in which a non-contact operation is performed can be fixed, a stable non-contact operation can be performed.

Next, the operation attribute of the "move-down operation" is a three-dimensional touch event. In a state where a desired icon is selected, by detecting that the selected icon is moved to the second layer down from the current layer, the controller 15 recognizes that the move-down operation has been performed.

Specifically, for example, in a state where a non-contact operation is performed in the first operation layer and a desired icon is selected, when the selected icon is moved to the third operation layer, which is the second layer down from the current layer, the controller 15 recognizes that the move-down operation has been performed.

In the case where the move-down operation is detected, if the controller 15 determines that an assist-touch operation has not been performed, the controller 15 moves the selected icon to the second layer down from the current layer in accordance with the move-down operation.

Meanwhile, in the case where the move-down operation is detected, if the controller 15 determines that an assist-touch operation has been performed, the controller 15 cancels the move-down operation. Then, the controller 15 fixes the layer in which a non-contact operation is to be performed to the original non-contact operation layer in which the non-contact operation was performed before the execution of the move-down operation.

Accordingly, since the non-contact operation layer in which a non-contact operation is performed can be fixed, a stable non-contact operation can be performed.

Effects of Embodiments

As is clear from the explanations above, the cellular phone device of this embodiment divides the space above the display unit 5 serving as an electrostatic-capacitance touch panel into a plurality of, for example, three operation layers. On the basis of electrostatic capacitances different among the operation layers, an operation layer in which a non-contact operation is performed is detected. Furthermore, on the basis of the transition pattern of electrostatic capacitances, a non-contact operation form is detected, and on the basis of the individual electrostatic capacitances used for detecting the non-contact operation form, the two-dimensional non-contact operation position in the operation layer is detected.

Accordingly, in addition to a two-dimensional input operation form in which a contact operation is performed on the operation surface part 5a of the display unit 5, a new three-dimensional input operation form in which an operation is performed for each of the operation layers in the space above the display unit 5 without the operation surface part 5a of the display unit 5 being touched can be provided.

Furthermore, according to an embodiment of the present disclosure, there is provided (1) an information processing apparatus, comprising: a touch panel that detects a non-contact operation of an operation element by detecting an electrostatic capacitance of an operation surface of the touch panel; and a controller that determines a distance between the operation surface and the operation element based on the detected electrostatic capacitance, and controls a predetermined operation of the information processing apparatus based on the determined distance.

(2) The information processing apparatus of (1), wherein the touch panel is a projection-type electrostatic-capacitance touch panel.

(3) The information processing apparatus of (1) or (2), wherein the touch panel includes a substrate layer including an insulator film, an electrode layer arranged below the insulator film, and a control integrated circuit.

(4) The information processing apparatus of (3), wherein the touch panel includes a plurality of mosaic electrode patterns each including two layers of transparent electrodes in each of vertical and horizontal directions in the electrode layer.

(5) The information processing apparatus of any one of (1) to (4), further comprising: a display that displays one or a plurality of objects.

(6) The information processing apparatus of (5), wherein the controller controls the at least one object displayed on the display based on the determined distance.

(7) The information processing apparatus of (6), wherein the controller controls the display to change display forms of the at least one object displayed on the display based on the determined distance.

(8) The information processing apparatus of (5), wherein the controller controls the display to display to display an object corresponding to a distance within a first predetermined range among a plurality of individual objects on the display in a display form different from display forms of the other individual objects when the determined distance is within the first predetermined range.

(9) The information processing apparatus of (8), wherein the controller controls the display to display an object corresponding to a distance within a second predetermined range among the plurality of individual objects on the display in a display form different from display forms of the other individual objects when the determined distance is within the second predetermined range.

(10) The information processing apparatus of any one of (1) to (9), wherein the touch panel detects a contact operation of an operation element by detecting an electrostatic capacitance of the operation surface of the touch panel.

(11) The information processing apparatus of (9), wherein the touch panel detects a contact operation of an operation element by detecting an electrostatic capacitance of the operation surface of the touch panel, and the controller fixes an object for which the display form is changed in accordance with a non-contact operation when a contact operation is detected by the touch panel.

(12) The information processing apparatus of any one of (1) to (11), further comprising: a memory that stores a plurality of thresholds for electrostatic capacitances corresponding to ranges of individual distances between the operation surface and the operating element.

(13) The information processing apparatus of (12), wherein the controller determines the distance between the operation surface and the operation element by comparing each of the thresholds stored in the memory with the detected electrostatic capacitance.

(14) The information processing apparatus of any one of (1) to (13), further comprising: a plurality of vibration units provided at individual operation positions of the operation surface part, wherein the controller controls one of the plurality of vibration units corresponding to a position of the non-contact operation.

(15) A method performed by an information processing apparatus, the method comprising: detecting a non-contact operation of an operation element by detecting an electrostatic capacitance of an operation surface of a touch panel; determining a distance between the operation surface and the operation element based on the detected electrostatic capacitance; and controlling a predetermined operation of the information processing apparatus based on the determined distance.

(16) A non-transitory computer-readable medium including computer-program instructions, which when executed by an information processing apparatus, cause the information processing apparatus to perform a method comprising: detecting a non-contact operation of an operation element by detecting an electrostatic capacitance of an operation surface of a touch panel; determining a distance between the operation surface and the operation element based on the detected electrostatic capacitance; and controlling a predetermined operation of the information processing apparatus based on the determined distance.

Modifications

The embodiments described above are examples in which the present disclosure is applied to a cellular phone device.

However, the present disclosure can be applied to, for example, an electronic apparatus including a touch panel, such as a PHS telephone set (PHS: Personal Handyphone System), a PDA device (PDA: Personal Digital Assistant), a digital camera device, a digital video camera device, a portable game machine, and a notebook-sized personal computer device, as well as the cellular phone device. In any case, the same effects as those of the embodiments described above can be achieved.

In conclusion, the embodiments described above are merely examples of the present disclosure. Thus, the present disclosure is not limited to the embodiments described above. Various changes, combinations, and other embodiments may be made to the present disclosure in accordance with design or other elements, as long as they are within the scope of the claims of the present disclosure or equivalent to the claims. This should be understood by those skilled in the art.

The invention claimed is:

1. An information processing apparatus, comprising:
a display configured to display one or a plurality of objects;
a touch panel configured to detect a non-contact operation of an operation element by detecting an electrostatic capacitance of an operation surface of the touch panel; and
circuitry configured to
control the display to display a first object selected by a user through the non-contact operation from among a plurality of objects on the display in a first display form different from display forms of the other objects when it is determined that the non-contact operation is within a predetermined range of the touch panel; and
control the display to display the first object in a second display form different from the first display form when it is determined that the non-contact operation is not within the predetermined range of the touch panel,
wherein the plurality of objects comprises a plurality of representations each representing one of a plurality of data files, and
wherein the first display form comprises a first graphical representation of the object, the second display form comprises a second graphical representation of the object, and the first graphical representation and the second graphical representation differ in a respect other than size.

2. The information processing apparatus of claim 1, wherein
the touch panel is a projection-type electrostatic-capacitance touch panel.

3. The information processing apparatus of claim 1, wherein
the touch panel includes a substrate layer including an insulator film, an electrode layer arranged below the insulator film, and a control integrated circuit.

4. The information processing apparatus of claim 3, wherein
the touch panel includes a plurality of mosaic electrode patterns each including two layers of transparent electrodes in each of vertical and horizontal directions in the electrode layer.

5. The information processing apparatus of claim 1, wherein
the touch panel detects a contact operation of an operation element by detecting an electrostatic capacitance of the operation surface of the touch panel.

6. The information processing apparatus of claim 1, wherein
the touch panel detects a contact operation of an operation element by detecting an electrostatic capacitance of the operation surface of the touch panel, and
the circuitry is configured to identify the first object for which the display form is changed in accordance with a non-contact operation when a contact operation is detected by the touch panel.

7. The information processing apparatus of claim 1, further comprising:
a memory that stores a plurality of thresholds for electrostatic capacitances corresponding to ranges of individual distances between the operation surface and the operating element.

8. The information processing apparatus of claim 7, wherein
the circuitry is configured to determine the distance between the operation surface and the operation element by comparing each of the thresholds stored in the memory with the detected electrostatic capacitance.

9. The information processing apparatus of claim 1, further comprising:
a plurality of vibration units provided at individual operation positions of the operation surface part, wherein the controller controls one of the plurality of vibration units corresponding to a position of the non-contact operation.

10. The information processing apparatus of claim 1, wherein
the circuitry is configured to determine whether the non-contact operation is within the predetermined range based on the electrostatic capacitance detected by the touch panel.

11. The information processing apparatus of claim 1, wherein
the circuitry is configured to control the display to display the first object in an enlarged form compared to the other objects when it is determined that the non-contact operation is within the predetermined range of the touch panel.

12. The information processing apparatus of claim 1, wherein
the circuitry is configured to control the display to not change a display form of the first object when it is determined that the non-contact operation is not within the predetermined range of the touch panel.

13. A method performed by an information processing apparatus, the method comprising:
displaying one or a plurality of objects;
detecting a non-contact operation of an operation element by detecting an electrostatic capacitance of an operation surface of a touch panel;
displaying a first object selected by a user through the non-contact operation from among a plurality of objects on the display in a first display form different from display forms of the other objects when it is determined that the non-contact operation is within a predetermined range of the touch panel; and
displaying the first object in a second display form different from the first display form when it is determined that the non-contact operation is not within the predetermined range of the touch panel, wherein the plurality of objects comprises a plurality of representations each representing one of a plurality of data files, and wherein the first display form comprises a first graphical representation of the object, the second display form comprises a second graphical representation of the object, and the first graphical representation and the second graphical representation differ in a respect other than size.

14. The method of claim 13, further comprising:

determining whether the non-contact operation is within the predetermined range based on the electrostatic capacitance detected by the touch panel.

15. The method of claim 13, wherein displaying the object in the first display form includes displaying the first object in an enlarged form compared to the other objects when it is determined that the non-contact operation is within the predetermined range of the touch panel.

16. The method of claim 13, wherein displaying the object in the first display form includes not changing a display form of the first object when it is determined that the non-contact operation is not within the predetermined range of the touch panel.

17. A non-transitory computer-readable medium including computer-program instructions, which when executed by an information processing apparatus, cause the information processing apparatus to:

detect a non-contact operation of an operation element by detecting an electrostatic capacitance of an operation surface of a touch panel;

display a first object selected by a user through the non-contact operation from among a plurality of objects on a display in a first display form different from display forms of the other objects when it is determined that the non-contact operation is within a predetermined range of the touch panel; and display the first object in a second display form different from the first display form when it is determined that the non-contact operation is not within the predetermined range of the touch panel, wherein the plurality of objects comprises a plurality of representations each representing one of a plurality of data files, and wherein the first display form comprises a first graphical representation of the object, the second display form comprises a second graphical representation of the object, and the first graphical representation and the second graphical representation differ in a respect other than size.

18. The non-transitory computer-readable medium of claim 17, wherein the computer-program instructions are further configured to cause the information processing apparatus to:

determine whether the non-contact operation is within the predetermined range based on the electrostatic capacitance detected by the touch panel.

19. The non-transitory computer-readable medium of claim 17, wherein displaying the object in the first display form includes displaying the first object in an enlarged form compared to the other objects when it is determined that the non-contact operation is within the predetermined range of the touch panel.

20. The non-transitory computer-readable medium of claim 17, wherein displaying the object in the first display form includes not changing a display form of the first object when it is determined that the non-contact operation is not within the predetermined range of the touch panel.

* * * * *